United States Patent
Sasaki et al.

(10) Patent No.: US 6,591,818 B2
(45) Date of Patent: Jul. 15, 2003

(54) INTERNAL COMBUSTION ENGINE AND METHOD FOR RECIRCULATING EXHAUST GAS

(75) Inventors: Shizuo Sasaki, Numazu (JP); Kouji Yoshizaki, Numazu (JP); Masato Gotoh, Mishima (JP); Takekazu Ito, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 130 days.

(21) Appl. No.: 09/880,110

(22) Filed: Jun. 14, 2001

(65) Prior Publication Data

US 2001/0052341 A1 Dec. 20, 2001

(30) Foreign Application Priority Data

Jun. 19, 2000 (JP) ........................................ 2000-187545

(51) Int. Cl.[7] ............................. F02M 25/07; F02B 47/08
(52) U.S. Cl. ................................................ 123/568.12
(58) Field of Search ...................... 123/568.11, 568.12, 123/568.21, 568.31, 676; 60/274, 276

(56) References Cited

U.S. PATENT DOCUMENTS

| 5,482,020 A | * | 1/1996 | Shimizu et al. ......... 123/406.47 |
| 5,632,144 A | * | 5/1997 | Isobe .......................... 60/277 |
| 5,724,808 A | * | 3/1998 | Ito et al. ....................... 60/276 |
| 5,732,554 A | * | 3/1998 | Sasaki et al. .................. 60/278 |
| 5,743,243 A | * | 4/1998 | Yanagihara ............... 123/568.12 |
| 5,967,113 A |   | 10/1999 | Kaneko et al. |
| 6,240,723 B1 | * | 6/2001 | Ito et al. ....................... 60/278 |

FOREIGN PATENT DOCUMENTS

| JP | A 11-166435 | 6/1999 |
| JP | A 2000-97078 | 4/2000 |

* cited by examiner

Primary Examiner—Mahmoud Gimie
(74) Attorney, Agent, or Firm—Oliff & Berridge, PLC.

(57) ABSTRACT

An internal combustion engine performs a second mode of combustion where the EGR is less than the EGR gas that peaks the production of soot. The engine then performs a first mode of combustion where the EGR is greater than the EGR that peaks the production of soot. During the second mode, the engine curbs hydrocarbon supplied to an exhaust gas control catalyst by performing a combustion where hydrocarbon does not increase. The exhaust gas temperature discharged becomes relatively high and the EGR rate is set to zero. The engine then increases the hydrocarbon supplied to the catalyst by performing a combustion that increases the hydrocarbon. The temperature of exhaust gas discharged becomes relatively high, and the EGR rate is gradually increased. Accordingly, the engine quickly warms up the catalyst while preventing problems that occur, like clogging of an exhaust gas recirculation passage.

12 Claims, 14 Drawing Sheets

F I G. 16
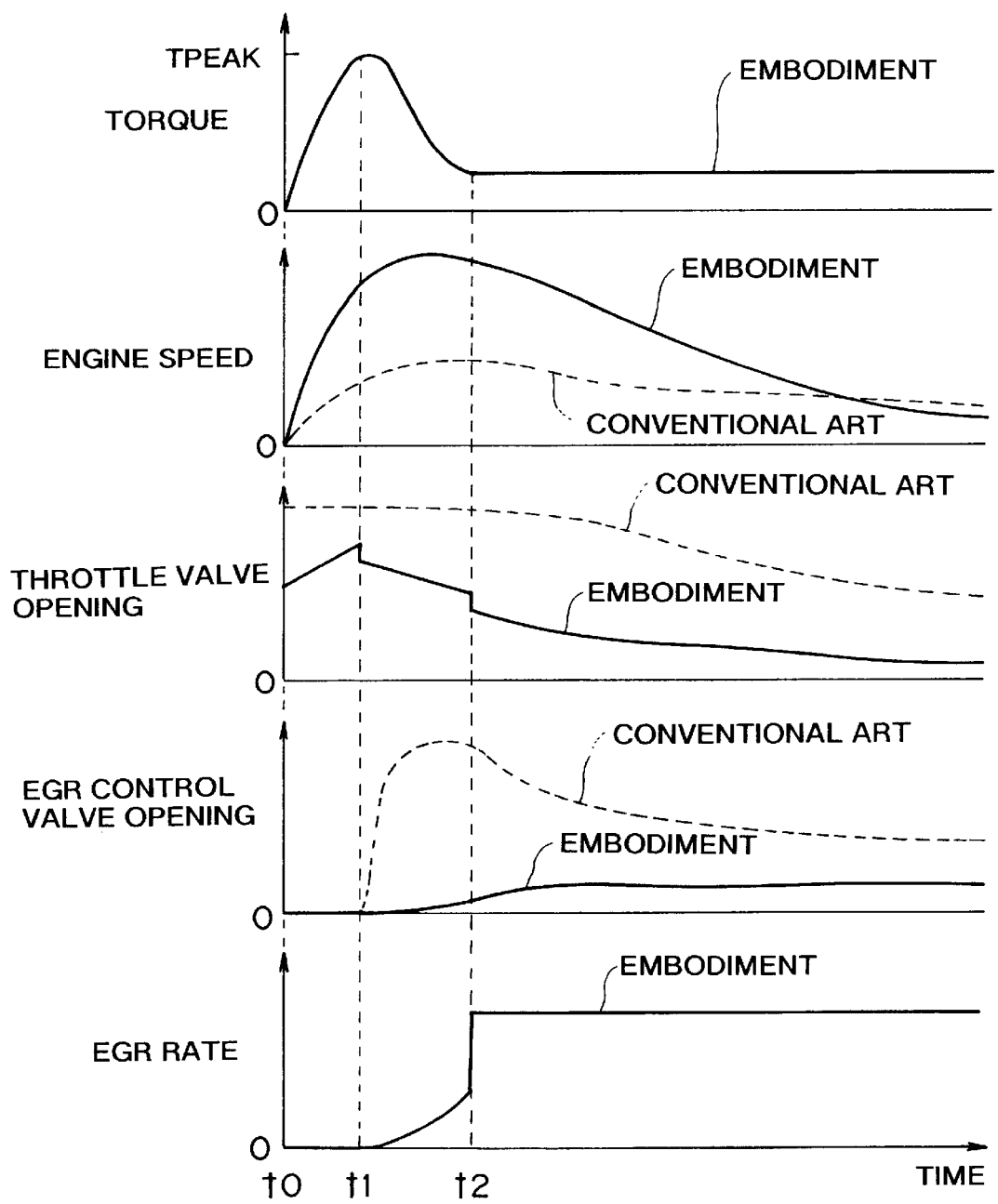

INTERNAL COMBUSTION ENGINE AND METHOD FOR RECIRCULATING EXHAUST GAS

INCORPORATION BY REFERENCE

The disclosure of Japanese Patent Application No. 2000-187545 filed on Jun. 19, 2000 including the specification, drawings and abstract is incorporated herein by reference in its entirety.

BACKGROUND OF THE INVENTION

1. Field of Invention

The present invention relates to an internal combustion engine.

2. Description of Related Art

In a known internal combustion engine, an exhaust gas recirculation passage is provided for recirculating exhaust gas discharged from a combustion chamber into an intake passage of the engine. In such an internal combustion engine, as the amount of recirculation exhaust gas supplied into the combustion chamber is increased, the amount of soot produced gradually increases and reaches a peak. As the amount of recirculation exhaust gas supplied into the combustion chamber is further increased, the temperature of fuel and its surrounding gas upon combustion in the combustion chamber becomes lower than a temperature that allows soot to be produced, so that substantially no soot is produced. At the time of startup, this internal combustion engine performs a second mode of combustion in which the amount of recirculation exhaust gas supplied into the combustion chamber is less than the amount of recirculation exhaust gas that peaks the amount of soot produced. Subsequently, the engine performs a first mode of combustion in which the amount of recirculation exhaust gas supplied into the combustion chamber is greater than the amount of recirculation exhaust gas that peaks the production of soot and therefore substantially no soot is produced. An example of this internal combustion engine is described in, for example, Japanese Patent Application Laid-Open No. HEI 11-166435.

Japanese Patent Application Laid-Open No. HEI 11-166435 describes that at the time of start-up, the engine is warmed up by performing the second mode of combustion in order to activate a catalyst that controls exhaust gas discharged from the combustion chamber. However, this patent application does not disclose a method for preventing hydrocarbons present in exhaust gas from passing through the catalyst before the catalyst becomes able to remove hydrocarbons from exhaust gas. Therefore, Japanese Patent Application Laid-Open No. HEI 11-166435 also does not disclose that a means for accelerating the catalyst warm-up rate, after the catalyst has become able to control hydrocarbons present in exhaust gas, is provided during an operation for preventing hydrocarbons in exhaust gas from passing through the catalyst before the catalyst becomes able to control hydrocarbons in exhaust gas. In short, Japanese Patent Application Laid-Open No. HEI 11-166435 does not disclose a method for increasing the catalyst warm-up rate while preventing hydrocarbons from passing through the catalyst. Therefore, the internal combustion engine described in Japanese Patent Application Laid-Open No. HEI 11-166435 is not capable of quickly completing the warm-up of the catalyst while preventing hydrocarbons from passing through the catalyst, and is not capable of switching from the second mode of combustion to the first mode of combustion at an early time.

SUMMARY OF THE INVENTION

It is an object of the invention to provide an internal combustion engine capable of quickly completing the warm-up of a catalyst while substantially preventing passage of hydrocarbon through the catalyst, and of switching combustion from a second mode of combustion to a first mode of combustion at an early time.

In accordance with a first mode of the invention, an internal combustion engine has an exhaust gas recirculation passage for recirculating an exhaust gas discharged from a combustion chamber into an engine intake passage, wherein as an amount of a recirculation exhaust gas supplied into the combustion chamber is increased, an amount of a soot produced gradually increases and peaks. As the amount of the recirculation exhaust gas supplied into the combustion chamber is further increased, a temperature of a fuel and a surrounding gas upon combustion in the combustion chamber becomes lower than a temperature that allows the soot to be produced, so that substantially no soot is produced. At engine start-up, the engine first performs a second combustion in which the amount of the recirculation exhaust gas supplied into the combustion chamber is less than the amount of recirculation exhaust gas that peaks the amount of the soot produced. Then, the engine performs a first combustion in which the amount of recirculation exhaust gas supplied into the combustion chamber is greater than the amount of recirculation exhaust gas that peaks the amount of the soot produced, and substantially no soot is produced. The internal combustion engine includes an exhaust gas control catalyst for purifying the exhaust gas discharged from the combustion chamber. When the second combustion is performed at the start-up, the engine first curbs an amount of a hydrocarbon supplied to the exhaust gas control catalyst by performing a combustion in which the amount of the hydrocarbon in the exhaust gas does not increase, and a temperature of the exhaust gas discharged from the combustion chamber becomes relatively high. Then, the engine increases the amount of the hydrocarbon supplied to the exhaust gas control catalyst by performing a combustion in which the amount of the hydrocarbon in the exhaust gas increases, and the temperature of the exhaust gas discharged from the combustion chamber becomes relatively high.

According to the internal combustion engine in the first mode of the invention, at the start-up, when performing, the second combustion in which the amount of the recirculation exhaust gas supplied into the combustion chamber is less than the amount of recirculation exhaust gas that peaks the amount of the soot produced, the engine first curbs the amount of hydrocarbon supplied to the exhaust gas control catalyst by performing the combustion in which the amount of hydrocarbon in exhaust gas does not increase, and the temperature of the exhaust gas discharged from the combustion chamber becomes relatively high. That is, when the second combustion is performed at engine start-up, and the exhaust gas control catalyst has not become able to remove hydrocarbon from exhaust gas, the engine of the invention curbs the amount of hydrocarbon supplied to the exhaust gas control catalyst by performing the combustion in which the amount of hydrocarbon in exhaust gas does not increase. Therefore, the engine of the invention is able to prevent hydrocarbon in exhaust gas from freely passing through the exhaust gas control catalyst. Furthermore, while preventing hydrocarbon in exhaust gas from freely passing through the exhaust gas control catalyst before the exhaust gas control catalyst becomes able to remove hydrocarbon from exhaust gas, the internal combustion engine performs the combustion in which the temperature of exhaust gas discharged from the combustion chamber becomes relatively high. Thus, the temperature of the exhaust gas control catalyst is raised, i.e., a preparation for raising the temperature of the exhaust gas control catalyst is performed. As a result, the warm-up rate of the exhaust gas control catalyst, after the catalyst has become able to remove hydrocarbon from exhaust gas, can be increased.

Furthermore, the above-described internal combustion engine, while performing the second combustion at engine start-up, increases the amount of hydrocarbon supplied to the exhaust gas control catalyst by performing the combustion in which the amount of hydrocarbon in the exhaust gas increases, and the temperature of exhaust gas discharged from the combustion chamber becomes relatively high. This function is performed after curbing the amount of hydrocarbon supplied to the exhaust gas control catalyst by performing the combustion in which the amount of hydrocarbon in exhaust gas does not increase, and the temperature of exhaust gas discharged from the combustion chamber becomes relatively high. That is, after the exhaust gas control catalyst has become able to remove hydrocarbon from exhaust gas during the second combustion at the time of start-up, the engine raises the temperature of exhaust gas supplied to the exhaust gas control catalyst, and increases the amount hydrocarbon contained in the exhaust gas. Therefore, the duration between the time when the exhaust gas control catalyst becomes able to remove hydrocarbon from exhaust gas, and the time when the warm-up of the exhaust gas control catalyst is completed, can be reduced. Namely, the internal combustion engine of the first mode of the invention is able to quickly complete the warm-up of the exhaust gas control catalyst, while preventing hydrocarbon from freely passing through the exhaust gas control catalyst, and additionally accomplishes the switching from the second combustion to the first combustion at an early time.

In the first mode of the invention, it is possible to adopt a construction wherein, as the exhaust gas control catalyst, a recirculation exhaust gas control catalyst is disposed in the exhaust gas recirculation passage. Here, the engine sets the amount of the recirculation exhaust gas to zero when performing the combustion in which the amount of the hydrocarbon in the exhaust gas does not increase, and the temperature of the exhaust gas discharged from the combustion chamber becomes relatively high. Furthermore, the engine gradually increases the amount of the recirculation exhaust gas when performing the combustion in which the amount of the hydrocarbon in the exhaust gas increases, and the temperature of the exhaust gas discharged from the combustion chamber becomes relatively high.

According to this mode, during the second combustion at the start-up of the engine, when the engine performs the combustion in which the amount of the hydrocarbon in the exhaust gas does not increase, and the temperature of the exhaust gas discharged from the combustion chamber becomes relatively high, the amount of recirculation exhaust gas is controlled to be zero. That is, the amount of recirculation exhaust gas is controlled to be zero before the recirculation exhaust gas control catalyst becomes able to remove hydrocarbon from recirculation exhaust gas during the second combustion at the time of start-up of the engine. Therefore, the engine is able to prevent problems that occur when the recirculation exhaust gas control catalyst is not able to remove hydrocarbon from recirculation exhaust gas, and recirculation exhaust gas is caused to flow through the exhaust gas recirculation passage, thus resulting in the clogging of the exhaust gas recirculation passage.

Furthermore, while the amount of recirculation exhaust gas is controlled to be zero before the recirculation exhaust gas control catalyst becomes able to remove hydrocarbon from recirculation exhaust gas, the engine performs the combustion in which the temperature of the exhaust gas discharged from the combustion chamber becomes relatively high. Therefore, a preparation for raising the temperature of the recirculation exhaust gas control catalyst can be performed. As a result, when recirculation exhaust gas is caused to flow through the recirculation exhaust gas control catalyst, high-temperature recirculation exhaust gas flows through the recirculation exhaust gas control catalyst. Therefore, the warm-up rate of the recirculation exhaust gas control catalyst after the catalyst has becomes able to remove hydrocarbon from recirculation exhaust gas can be increased.

Furthermore, the internal combustion engine, while performing the second combustion at the start-up, gradually increases the amount of recirculation exhaust gas when performing the combustion in which the amount of hydrocarbon in the exhaust gas increases, and the temperature of exhaust gas discharged from the combustion chamber becomes relatively high. This function is performed after controlling the amount of recirculation exhaust gas to be zero when performing the combustion in which the amount of hydrocarbon in the exhaust gas does not increase, and the temperature of exhaust gas discharged from the combustion chamber becomes relatively high. That is, after the recirculation exhaust gas control catalyst becomes able to remove hydrocarbon from recirculation exhaust gas during the second combustion at the start-up of the engine, the engine raises the temperature of recirculation exhaust gas supplied to the recirculation exhaust gas control catalyst, and increases the amount of hydrocarbon contained in the recirculation exhaust gas. Furthermore, the engine gradually increases the amount of recirculation exhaust gas. Therefore, the duration between the time when the recirculation exhaust gas control catalyst becomes able to remove hydrocarbon from recirculation exhaust gas, and the time when the warm-up of the recirculation exhaust gas control catalyst is completed, can be reduced. Namely, this engine is able to quickly complete the warm-up of the recirculation exhaust gas control catalyst, while preventing the clogging of the exhaust gas recirculation passage, and additionally accomplishes the switching from the second combustion to the first combustion at an early time.

In the first mode of the invention, it is possible to adopt a construction wherein, when the second combustion is performed at the start-up of the engine, the engine performs a main fuel injection near a compression top dead center, and an additional fuel injection at a timing different from a timing of the main fuel injection. The engine further reduces an amount of an intake air in order to perform the combustion in which the amount of the hydrocarbon in the exhaust gas increases, and the temperature of the exhaust gas discharged from the combustion chamber becomes relatively high.

According to this mode, during the second combustion at the startup, the engine performs the main fuel injection near the compression top dead center, an additional fuel injection at a timing different from the timing of the main fuel injection, and also reduces the amount of intake air. That is, in addition to the main injection in the vicinity of the compression top dead center, the injection at the timing that is different from the timing of the main injection is performed, the amount of unburned hydrocarbon in exhaust gas can be increased. Furthermore, due to the post-combustion of the unburned hydrocarbon, the temperature of exhaust gas discharged from the combustion chamber can be made relatively high. Moreover, the reduction in the amount of intake air also raises the temperature of exhaust gas discharged from the combustion chamber to a relatively high temperature level.

In the first mode of the invention, it is also possible to adopt a construction wherein the engine gradually increases the amount of the recirculation exhaust gas from zero when the temperature of the exhaust gas has reached a temperature that is sufficiently high to warm up the recirculation exhaust gas control catalyst.

According to this mode, when the exhaust gas temperature becomes sufficiently high for warming up the recirculation exhaust gas control catalyst, the amount of recirculation exhaust gas is gradually increased from zero. That is, while the exhaust gas temperature is still low and the recirculation exhaust gas control catalyst is not able to remove hydrocarbon from recirculation exhaust gas, the amount of recirculation exhaust gas is controlled to zero. After the exhaust gas temperature becomes high and the recirculation exhaust gas control catalyst becomes able to remove hydrocarbon from recirculation exhaust gas, the amount of recirculation exhaust gas is gradually increased from zero. Therefore, the engine reliably prevents problems that occur when the recirculation exhaust gas control catalyst is not able to remove hydrocarbon from recirculation exhaust gas, and recirculation exhaust gas is caused to flow through the exhaust gas recirculation passage, thus resulting in the clogging of the exhaust gas recirculation passage.

In the first mode of the invention, it is also possible to adopt a construction wherein, when the recirculation exhaust gas control catalyst has been warmed up, the second combustion is switched to the first combustion.

According to this mode, the combustion is switched from the second combustion to the first combustion when the warm-up of the recirculation exhaust gas control catalyst is completed. That is, when the warm-up of the recirculation exhaust gas control catalyst is completed and the recirculation exhaust gas control catalyst is able to remove a large amount of hydrocarbon, the second combustion is switched to the first combustion, and the amount of recirculation exhaust gas is increased in a stepped-up manner. Therefore, the engine is able to prevent problems that occur when the warm-up of the recirculation exhaust gas control catalyst has not been completed, and the recirculation exhaust gas control catalyst is not able to remove a large amount of hydrocarbon, thus causing a large amount of recirculation exhaust gas to flow through the exhaust gas recirculation passage and clog the exhaust gas recirculation passage.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein:

FIGS. 11A and 11B are diagrams indicating target degrees of opening of a throttle valve and the like;

FIGS. 13A and 13B are diagrams indicating target degrees of opening of a throttle valve and the like;

FIG. 16 is a diagram illustrating methods of controlling an operation of an internal combustion engine at the time of engine start-up.

DETAILED DESCRIPTION OF PREFERRED EMBODIMENTS

Preferred embodiments of the invention will be described hereinafter with reference to the accompanying drawings.

Figure 1:
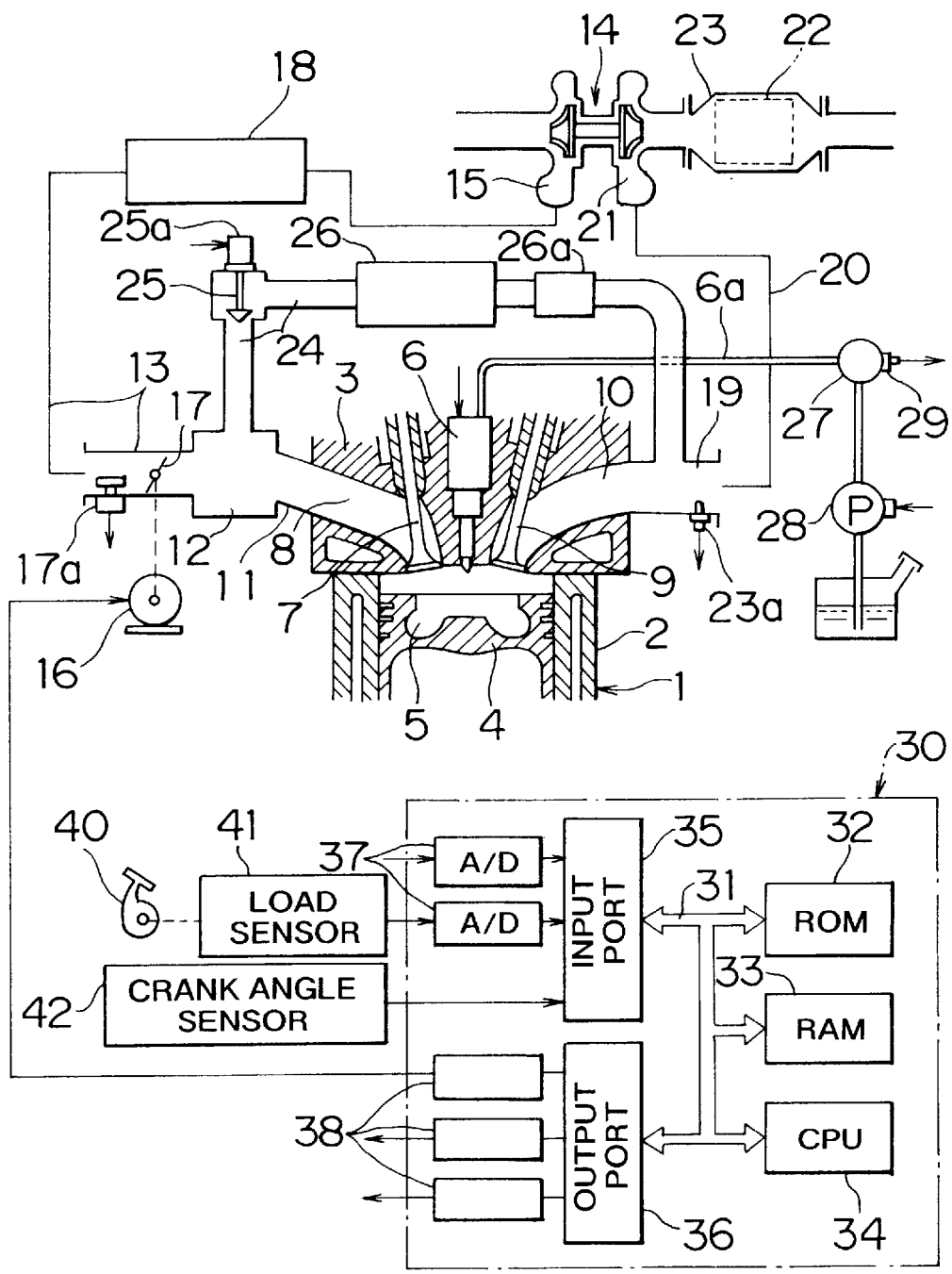
FIG. 1 is a diagram illustrating an overall construction of a compression ignition type internal combustion engine in accordance with a first embodiment of the invention.

FIG. 1 shows a first embodiment in which the invention is applied to a compression ignition type internal combustion engine. The internal combustion engine shown in FIG. 1 includes a main body 1 of the engine, a cylinder block 2, a cylinder head 3, a piston 4, a combustion chamber 5, an electrically controlled fuel injection valve 6, an intake valve 7, an intake port 8, an exhaust valve 9, and an exhaust port 10. The intake port 8 communicates with a surge tank 12 via a corresponding intake manifold 11. The surge tank 12 is connected to a compressor 15 of an exhaust turbocharger 14 via an intake duct 13. A throttle valve 17 that is driven by a stepping motor 16 is disposed within the intake duct 13. A mass flow detector 17a for detecting the mass flow of intake air is disposed within the intake duct 13 upstream of the throttle valve 17. Furthermore, an intercooler 18 for cooling intake air flowing in the intake duct 13 is disposed around the intake duct 13. In the embodiment shown in FIG. 1, engine coolant is led into the intercooler 18 so as to cool the intake air. On the other hand, the exhaust port 10 is connected to an exhaust turbine 21 of the exhaust turbocharger 14 via an exhaust manifold 19 and an exhaust pipe 20. An outlet of the exhaust turbine 21 is connected to a casing 23 that contains a catalyst 22 having an oxidizing function. An air-fuel ratio sensor 23a is disposed within the exhaust manifold 19.

The exhaust manifold 19 and the surge tank 12 are connected to each other through an exhaust gas recirculation (hereinafter, referred to as "EGR") passage 24. An electrically controlled EGR control valve 25 that is driven by a stepping motor 25a is disposed within the EGR passage 24. Also, a pipe catalyst 26a for purifying EGR gas that passes through the EGR passage 24 is disposed in the EGR passage 24. An EGR cooler 26 for cooling EGR gas that flows through the EGR passage 24 is disposed around the EGR passage 24. In the embodiment shown in FIG. 1, engine coolant is fed to the EGR cooler 26 so that the EGR gas is cooled by the engine coolant. Each fuel injection valve 6 is connected to a fuel reservoir, that is, a generally-termed common rail 27, via a fuel supply pipe 6a. Fuel is supplied from an electrically controlled fuel pump 28 whose ejection amount is variable, into the common rail 27. The fuel supplied into the common rail 27 is supplied to each fuel injection valve 6 through a corresponding fuel supply pipe 6a. The common rail 27 is equipped with a fuel pressure sensor 29 for detecting the fuel pressure within the common rail 27. In operation, the ejection amount of the fuel pump 28 is controlled based on an output signal of the fuel pressure sensor 29 so that the fuel pressure within the common rail 27 becomes equal to a target fuel pressure.

An electronic control unit 30 is formed by a digital computer, having a ROM (read only memory) 32, a RAM (random access memory) 33, a CPU (microprocessor) 34, an input port 35 and an output port 36 which are connected to each other via a bidirectional bus 31. The output signal of the fuel pressure sensor 29 is inputted to the input port 35 via a corresponding one of AD converters 37. The output signal of the mass flow detector 17a is inputted to the input port 35 via a corresponding AD converter 37. The output signal of the air-fuel ratio sensor 23a is inputted to the input port 35 via a corresponding AD converter 37. A load sensor 41 connected to an accelerator pedal 40 generates an output voltage that is proportional to the amount of depression L of the accelerator pedal 40. The output voltage of the load sensor 41 is inputted to the input port 35 via a corresponding AD converter 37. Also connected to the input port 35 is a crank angle sensor 42 that generates an output pulse each time the crankshaft rotates, for example, 30°. On the other hand, the output port 36 is connected to the fuel injection valves 6, the throttle valve-driving stepping motor 16, the EGR control valve-driving stepping motor 25a and the fuel pump 28, via corresponding drive circuits 38.

Figure 2:
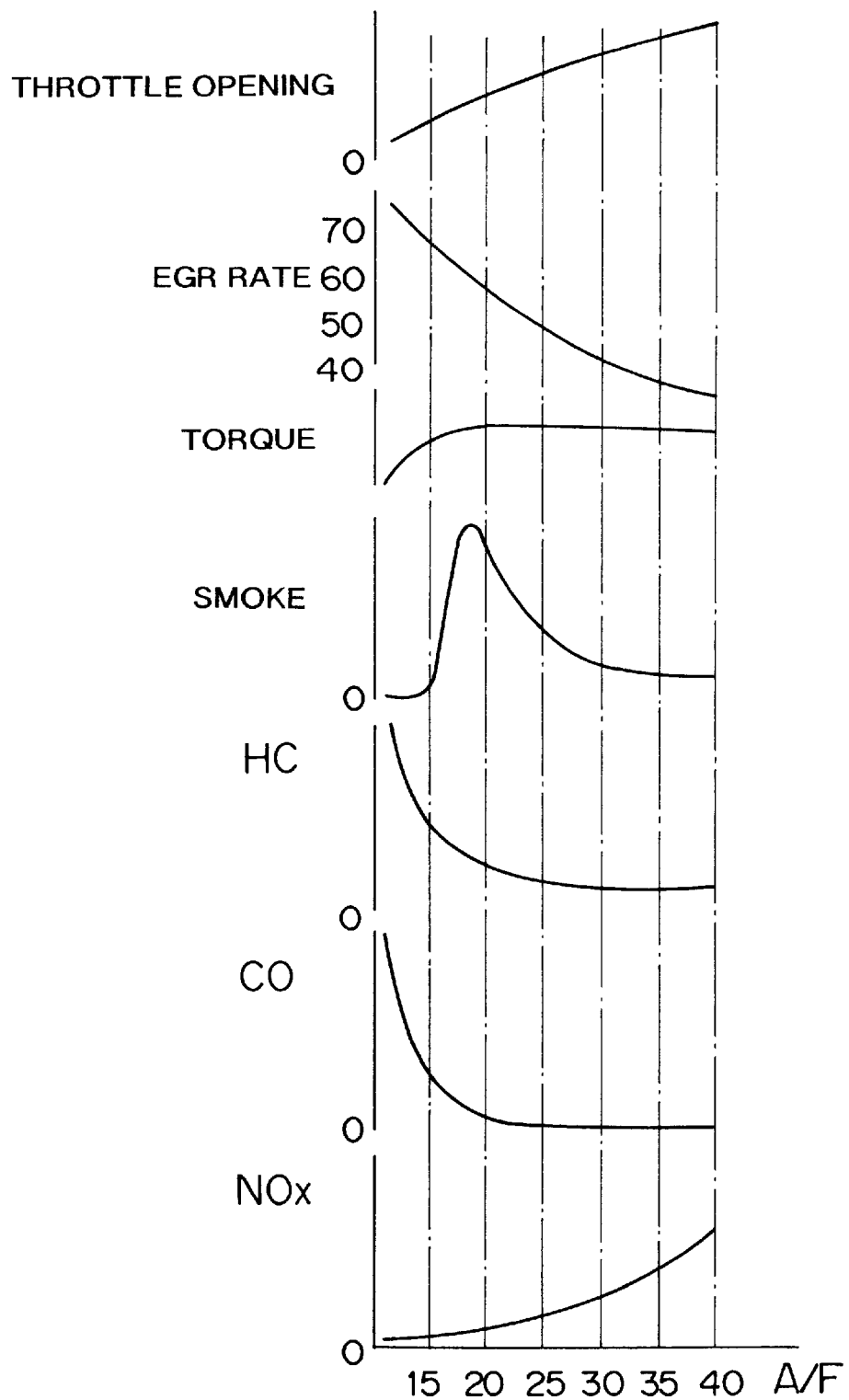
FIG. 2 is a diagram indicating an amount of emissions produced.

FIG. 2 indicates changes in the output torque and changes in the discharged amounts of smoke, HC, CO and NOx in an experiment in which the air-fuel ratio A/F (the horizontal axis in FIG. 2) is varied by changing the degree of opening of the throttle valve 17 and the EGR rate during a low-load operation of the engine. It is understood from FIG. 2 that the air-fuel ratio A/F decreases as the EGR rate is increased in this experiment, and that the air-fuel ratio A/F is equal to or smaller than the stoichiometric air-fuel ratio (≈14.6) when the EGR rate is equal to or greater than 65%. In the course of reducing the air-fuel ratio A/F by increasing the EGR rate as indicated in FIG. 2, the amount of smoke produced from the engine starts increasing when the EGR rate reaches the vicinity of 40% and the air-fuel ratio A/F becomes equal to about 30. If the EGR rate is further increased to reduce the air-fuel ratio A/F, the amount of smoke produced rapidly increases, and reaches its peak. If the EGR rate continues to be further increased so as to reduce the air-fuel ratio A/F, the amount of smoke sharply decreases, and becomes substantially equal to zero when the EGR rate is controlled to 65% or greater and the air-fuel ratio A/F is thereby reduced to about 15.0. Thus, substantially no soot is produced. At this moment, the engine output torque slightly decreases, and the amount of NOx produced becomes considerably small. In contrast, the amounts of HC and CO produced start increasing at this moment.

Figure 3A:
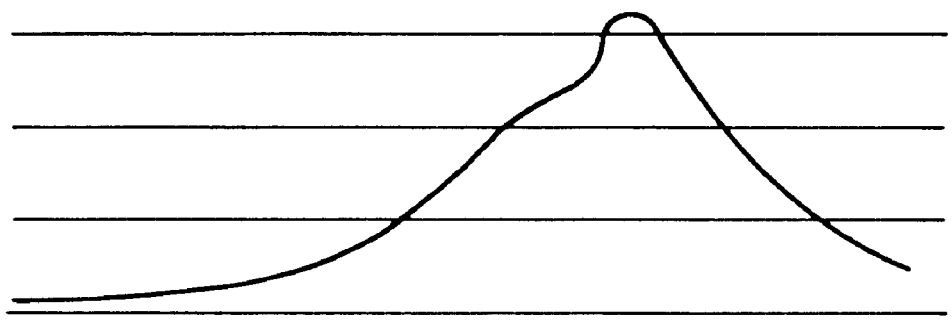
FIGS. 3A and 3B are diagram indicating combustion pressure.
Figure 3B:
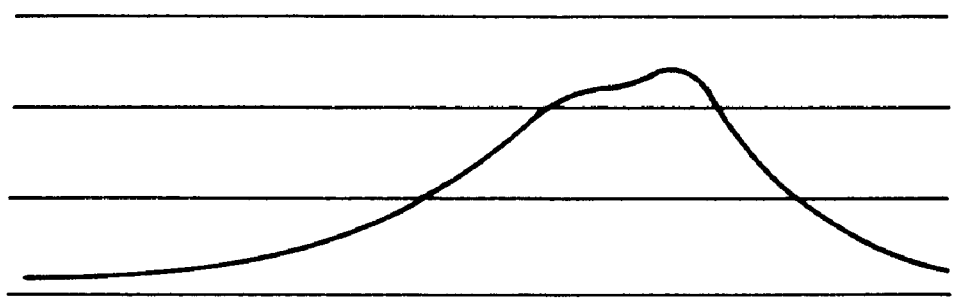

FIG. 3A indicates changes in the combustion pressure within the combustion chamber 5 when the amount of smoke produced is a maximum with the air-fuel ratio A/F being equal to about 21. FIG. 3B indicates changes in the combustion pressure within the combustion chamber 5 when the amount of smoke produced is substantially zero with the air-fuel ratio A/F being equal to about 18. By comparing FIGS. 3A and 3B, it will be understood that the combustion pressure is lower in the case of FIG. 3B where the amount of smoke produced is substantially zero than in the case of FIG. 3A where the amount of smoke produced is great.

Furthermore, although not indicated in the drawings, if has been found from results of experiments similar to those of FIGS. 3A and 3B that the maximum value (peak) of combustion pressure occurring during a first combustion mode (low-temperature combustion) in which the amount of EGR gas supplied into the combustion chamber 5 is greater than the amount of EGR gas that maximizes the amount of soot produced in the combustion chamber 5, where substantially no soot is produced, is lower than the maximum value (peak) of combustion pressure occurring during a second combustion mode (combustion based on the conventional combustion method) in which the amount of EGR gas supplied into the combustion chamber 5 is less than the amount of EGR gas that maximizes the production of soot. Therefore, it can be said that the engine revolution non-uniformity caused by explosions during the first combustion mode is less than the engine revolution non-uniformity caused by explosions during the second combustion mode.

From experiment results indicated in FIGS. 2, 3A and 3B, the following findings can be obtained. First, the amount of NOx produced is considerably reduced when the air-fuel ratio A/F is equal to or smaller than 15.0 and almost no smoke is produced, as indicated in FIG. 2. The reduction in the amount of NOx produced suggests that the combustion temperature within the combustion chamber 5 is lowered. Thus, it can be said that the combustion temperature within the combustion chamber 5 is lowered when almost no soot is produced. A similar understanding is possible from FIGS. 3A and 3B. That is, the combustion pressure is reduced during the state of FIG. 3B in which almost no soot is produced. Therefore, it can be said that the combustion temperature in the combustion chamber is lowered during this state.

Figure 4:
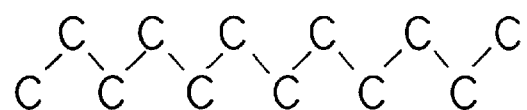
FIG. 4 is a diagram illustrating molecules of a fuel.
Figure 4:
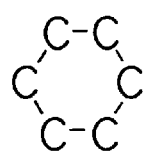
Figure 4:
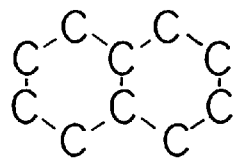

Second, as indicated in FIG. 2, the amounts of HC and CO discharged from the combustion chamber increase as the amount of smoke produced, i.e, the amount of soot produced, becomes substantially zero. This result means that hydrocarbon is discharged before growing into soot. Namely, straight chain hydrocarbons or aromatic hydrocarbons contained in the fuel as shown in FIG. 4 thermally decompose to form a precursor of soot as the temperature is raised with a lack of oxygen. Then, soot is produced which mainly consists of a solid as an aggregate of carbon atoms. In this case, the actual process of formation of soot is complicated, and the form taken by the soot precursor is not clear. In any event, hydrocarbons as shown in FIG. 4 grow into soot via a precursor of soot. The amounts of HC and CO discharged from the combustion chamber increase, as indicated in FIG. 2, when the amount of soot produced becomes substantially zero, as described above. HC present at this time are in the form of a precursor of soot or in the form of hydrocarbons that precede the precursor.

From the above considerations based on the results of experiments as indicated in FIG. 2 and FIGS. 3A and 3B, it is understood that the amount of soot produced becomes substantially zero when the combustion temperature within the combustion chamber 5 is low, and a soot precursor, or hydrocarbons preceding the precursor, are discharged from the combustion chamber 5. Further experiments and studies have revealed that the process of formation of soot stops midway, namely, no soot is produced, when the temperature of the fuel and its surrounding gas within the combustion chamber 5 is equal to, or lower than, a certain temperature, and that soot is produced when the temperature of the fuel and its surrounding within the combustion chamber 5 is higher than the aforementioned certain temperature.

The temperature of the fuel and its surrounding gas at which the growth process of hydrocarbon stops or ends in the state of a precursor of soot, i.e., the aforementioned certain temperature, cannot be determined as a specific temperature since the temperature depends upon the kind of fuel, air-fuel ratio, compression ratio and other factors. Nevertheless, the aforementioned temperature has a close relationship with the amount of NOx produced, and therefore can be defined to some degree based on the amount of NOx produced. Namely, as the EGR rate increases, the temperature of the fuel and its surrounding gas decreases, and the amount of NOx produced decreases. Almost no soot is produced when the amount of NOx produced becomes equal to about 10 ppm or less. Accordingly, the aforementioned temperature is substantially equal to the temperature at which the amount of NOx produced is about 10 ppm or less. Once soot is formed, it is impossible to remove the soot through an after treatment using a catalyst having an oxidizing function.

In contrast, a precursor of soot or hydrocarbons preceding the soot precursor can be easily removed through an after treatment using a catalyst having an oxidizing function. Taking into account the after treatment using a catalyst having an oxidizing function, a considerably large difference is made depending on whether hydrocarbon is discharged from the combustion chamber 5 in the form of a precursor of soot or in the form preceding the precursor, or is discharged therefrom in the form of soot. The novel combustion system used in the invention is characterized by discharging hydrocarbon in the form of a precursor of soot or its preceding form from the combustion chamber 5 without producing soot in the combustion chamber 5, and by oxidizing the discharged hydrocarbon by means of a catalyst having an oxidizing function.

To stop the growth of hydrocarbon in the state prior to formation of soot, the temperature of the fuel and its surrounding gas during combustion in the combustion chamber 5 needs to be controlled to a temperature that is lower than the temperature at which soot is normally formed. In this case, it has been found that the reducing of the temperature of the fuel, and its surrounding gas, is greatly influenced by the heat absorbing function of gas surrounding the fuel upon its combustion. More specifically, if there is only air around fuel, the vaporized fuel immediately reacts with oxygen in the air and bums. In this case, the temperature of the air remote from the fuel is not much elevated, and only the temperature around the fuel is locally elevated to a considerably high level. Namely, the air present remote from the fuel hardly functions to absorb combustion heat of the fuel. In this case, the combustion temperature locally rises to an extremely high level, and therefore unburned hydrocarbon is exposed to combustion heat, and thus forms soot.

However, in the case where the fuel exists in a mixture of a large amount of inert gas and a small amount of air, the situation differs. That is, evaporative fuel diffuses around, and reacts with oxygen that is mixed with the inert gas, and bums. In this case, combustion heat is absorbed by the surrounding inert gas, and therefore the combustion temperature does not rise so much, that is, the combustion temperature can be limited to a relatively low level. Thus, the inert gas present in the combustion chamber plays an important role in lowering the combustion temperature, and the combustion temperature can be controlled to a relatively low level, utilizing the heat absorbing function of the inert gas. In this case, it is necessary to provide inert gas in an amount large enough to absorb a sufficient quantity of heat so as to control the temperature of the fuel and its surrounding gas to a temperature lower than the level at which soot is normally formed. Thus, a needed amount of inert gas increases with an increase in the amount of the fuel used for combustion. In this connection, the inert gas performs a more powerful or effective heat absorbing function if the specific heat of the inert gas is greater. It is therefore preferable to use a gas having a larger specific heat as inert gas. Since $CO_2$ and the EGR gas have relatively great specific heats, it is preferable to use the EGR gas as the inert gas.

Figure 5:
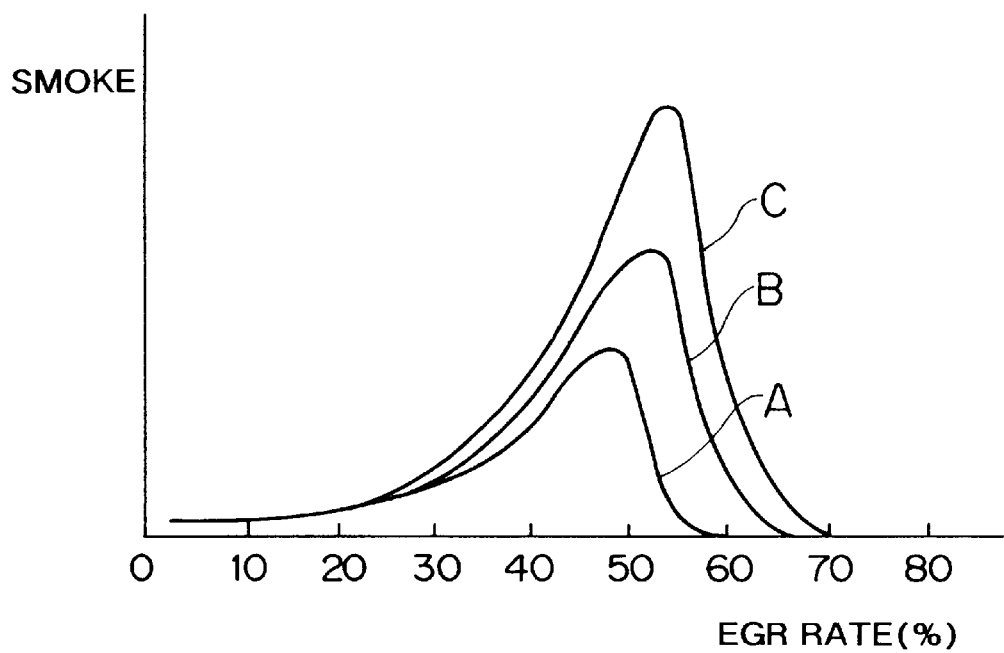
FIG. 5 is a diagram indicating relationships between an amount of smoke produced and an EGR rate.

FIG. 5 indicates relationships between the EGR rate and smoke when the EGR gas is used as an inert gas and the EGR gas is cooled to various degrees. In FIG. 5, curve A represents a case where the EGR gas is powerfully cooled, and the temperature of the EGR gas is maintained at about 90° C., and curve B represents a case where the EGR gas is cooled by a small-sized cooling system. Furthermore, curve C represents a case where the EGR gas is not forcibly cooled. Where the EGR gas is powerfully cooled as indicated by curve A in FIG. 5, the amount of soot produced reaches a peak at a point where the EGR rate is a little less than 50%. In this case, almost no soot is produced if the EGR rate is controlled to about 55% or greater. Where the EGR gas is cooled by some degree as indicated by curve B in FIG. 5, on the other hand, the production of soot peaks at a point where the EGR rate is a little greater than 50%. In this case, almost no soot is produced if the EGR rate is controlled to about 65% or greater.

Where the EGR gas is not forcibly cooled as indicated by curve C in FIG. 5, the amount of soot produced peaks at a point where the EGR rate is in the vicinity of 55%. In this case, almost no soot is produced if the EGR rate is controlled to about 70% or greater. FIG. 5 indicates the amount of smoke produced by the engine when the engine load is relatively high. As the engine load is reduced, the EGR rate at which the production of soot reaches a peak slightly decreases, and the lower limit of the EGR rate at which almost no soot is produced also slightly decreases. Thus, the lower limit of the EGR rate at which almost no soot is produced varies depending upon the degree of cooling of the EGR gas and the engine load.

Figure 6:
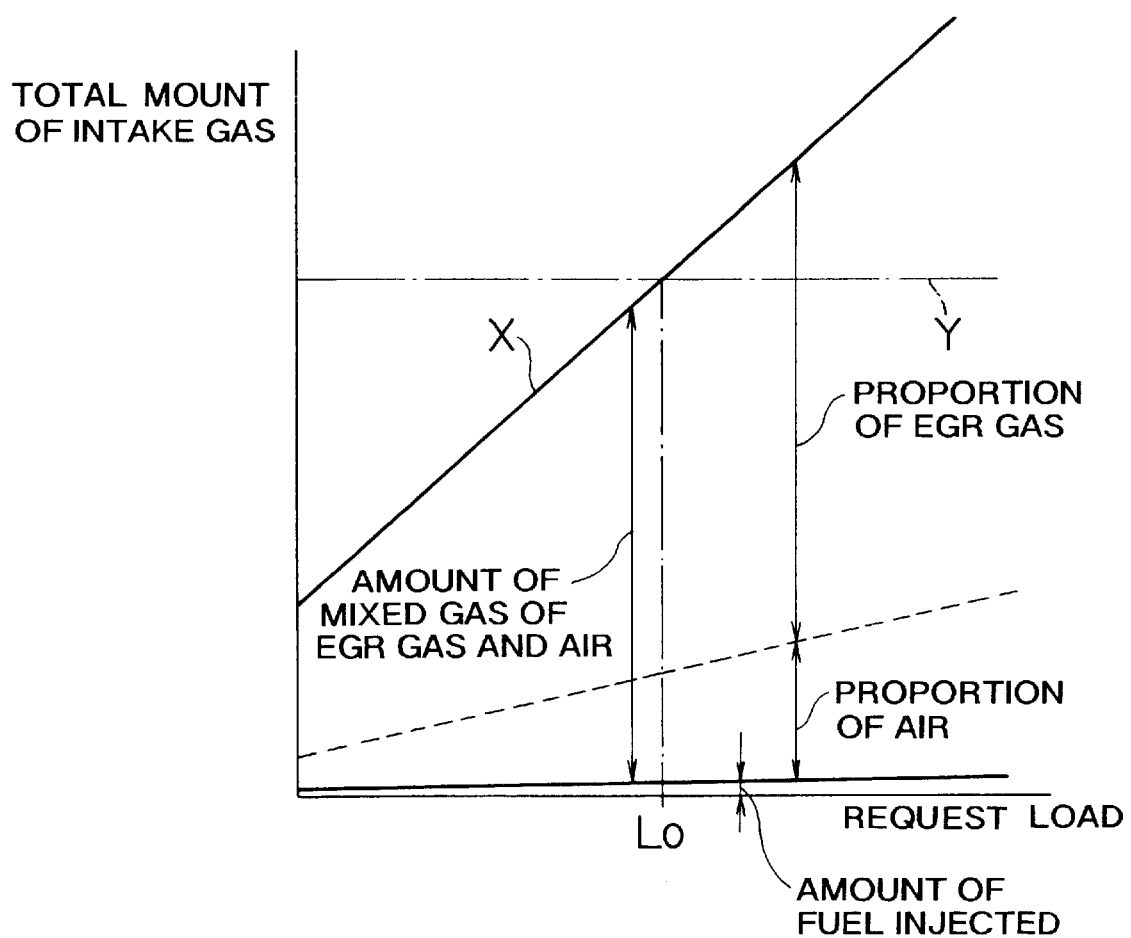
FIG. 6 is a diagram indicating a relationship between an amount of fuel injection and an amount of mixed gas.

FIG. 6 indicates the amount of a mixed gas of the air and the EGR gas used as an inert gas, which is needed to reduce the temperature of the fuel and its surrounding gas upon combustion to a temperature below the level at which soot is produced, the proportion of the air in the mixed gas, and the proportion of the EGR gas in the mixed gas. In FIG. 6, the vertical axis represents the total amount of gas that is introduced into the combustion chamber 5, and one-dot chain line Y indicates the total amount of gas that can be drawn into the combustion chamber when the engine is not supercharged. The horizontal axis represents the requested load.

Referring to FIG. 6, the proportion of the air, namely, the amount of the air present in the mixed gas, represents the amount of the air that is needed to completely bum the fuel injected into the combustion chamber. That is, in the case illustrated in FIG. 6, the ratio of the amount of the air to the amount of the fuel injected is equal to the stoichiometric air-fuel ratio. The proportion of the EGR gas in FIG. 6, namely, the amount of the EGR gas in the mixed gas, represents the minimum amount of EGR gas that is needed to bring the temperature of the fuel and its surrounding gas to a temperature that is lower than the temperature level at which soot is formed, when injected fuel is burned.

This amount of EGR gas is approximately 55% or greater in terms of EGR rate, and is 70% or greater in the embodiment indicated in FIG. 6. Namely, if the total amount of intake gas drawn into the combustion chamber 5 is controlled as indicated by solid line X in FIG. 6, and the proportion of the amount of the air to the amount of the EGR gas in the whole amount of intake gas X is controlled to a proportion as indicated in FIG. 6, the temperature of the fuel and its surrounding gas becomes lower than the level at which soot is produced, and therefore almost no soot is produced. The amount of NOx produced in this case is around 10 ppm or lower, which is considerably small.

If an increased amount of fuel is injected into the combustion chamber, the quantity of heat produced upon combustion of the fuel increases, and therefore the quantity of heat absorbed by the EGR gas must be increased in order to keep the temperature of the fuel and its surrounding gas at a level lower than the temperature at which soot is produced. Accordingly, the amount of the EGR gas must be increased as the amount of fuel injected increases, as indicated in FIG. 6. Namely, the amount of the EGR gas needs to be increased as the requested load is increased.

When supercharging is not performed, the upper limit of the total amount of intake gas X drawn into the combustion chamber 5 is indicated by Y. Therefore, in a region in FIG. 6 where the requested load is greater than Lo, the air-fuel ratio cannot be maintained at the stoichiometric air-fuel ratio unless the EGR gas proportion is reduced with increases in the requested load. That is, if an attempt is made to keep the air-fuel ratio at the stoichiometric air-fuel ratio in a region where the requested load is greater than Lo when the supercharging is not performed, the EGR rate decreases with increases in the requested load. Therefore, in the region where the requested load is greater than Lo, it becomes impossible to keep the temperature of the fuel and its surrounding gas at a temperature that is lower than the temperature that allows soot to be produced However, although not shown, if the EGR gas is recirculated to the inlet side of the supercharger, that is, into the air suction pipe of the exhaust turbocharger, via the EGR passage, the EGR rate can be maintained at 55% or higher, for example, 70%, in the region where the requested load is greater than Lo, so that the temperature of the fuel and its surrounding gas can be kept at a level below the temperature that allows soot to be produced. Namely, if the EGR gas is recirculated to cause the EGR rate in the air suction pipe to reach, for example, 70%, the EGR rate of the intake gas pressurized by the compressor of the exhaust turbocharger also becomes equal to 70%, so that up to the limit of pressure increase achievable by the compressor, the temperature of the fuel and its surrounding gas can be kept at a level below the temperature that allows soot to be produced. Therefore, it becomes possible to expand the region of operation of the engine in which the low-temperature combustion can be conducted. If it is desired that the EGR rate be at least 55% in the region where the requested load is greater than Lo, the EGR control valve is fully opened, and the throttle valve is operated slightly to the closing direction.

FIG. 6 indicates the case where the fuel is burned at the stoichiometric air-fuel ratio, as mentioned above. The amount of NOx produced can be controlled to around 10 ppm or less while production of soot is prevented, even if the amount of the air is reduced from the amount indicated in FIG. 6, i.e., if the air-fuel ratio is shifted to a fuel-richer ratio. Also, even if the amount of the air is made greater than that indicated in FIG. 6, i.e., if the average value of the air-fuel ratio is set in a lean range of 17 to 18, then the amount of NOx produced can be controlled to around 10 ppm or less while production of soot is prevented. That is, when the air-fuel ratio is rich, an excessive amount of fuel exists but the excessive fuel does not turn into soot since the combustion temperature is kept at a relatively low level. Therefore, no soot is produced. Also, only a considerably small amount of NOx is produced at this time. Even when the average air-fuel ratio is lean or the air-fuel ratio is substantially equal to the stoichiometric air-fuel ratio, a small amount of soot can be produced if the combustion temperature is elevated.

According to the present invention, however, the combustion temperature is controlled to a low level, so that substantially no soot is produced. Furthermore, NOx is produced only in a small amount. Thus, during the low-temperature combustion, no soot is produced and only a very small amount of NOx is produced irrespectively of the air-fuel ratio, i.e., irrespectively of whether the air-fuel ratio is rich or equal to the stoichiometric air-fuel ratio, or the average air-fuel ratio is lean. Therefore, it is preferable to control the average air-fuel ratio to a fuel-lean ratio in this case, in view of improvement in fuel consumption rate.

The occasion when the temperature of the fuel and its surrounding gas upon combustion thereof in the combustion chamber can be controlled to or below the temperature at which the growth of hydrocarbon stops midway is limited to when the engine is in a low-to-intermediate load operation state where heat produced by the combustion is relatively small. In the embodiment of the invention, therefore, during a low-to-intermediate load operation of the engine, the temperature of the fuel and its surrounding gas upon combustion is controlled to or below the temperature level at which the growth of hydrocarbon stops midway, so as to allow the first mode of combustion, i.e., the low-temperature combustion, to be carried out. When the engine load is relatively high, on the other hand, a control is performed so as to carry out the second mode of combustion, that is, the conventional combustion that is ordinarily performed according to the conventional art.

Furthermore, depending on the state of engine operation, the second mode of combustion may be carried out even when the engine is being operated with low to intermediate load. The term "first mode of combustion," or "low-temperature combustion," refers to a mode of combustion in which the amount of inert gas in the combustion chamber is greater than the amount of inert gas that peaks the production of soot, as is apparent from the foregoing description. The term "second mode of combustion," or "conventional combustion that is ordinarily performed in the conventional art," refers to a mode of combustion in which the amount of inert gas in the combustion chamber is less than the amount of inert gas that peaks the production of soot.

Figure 7:
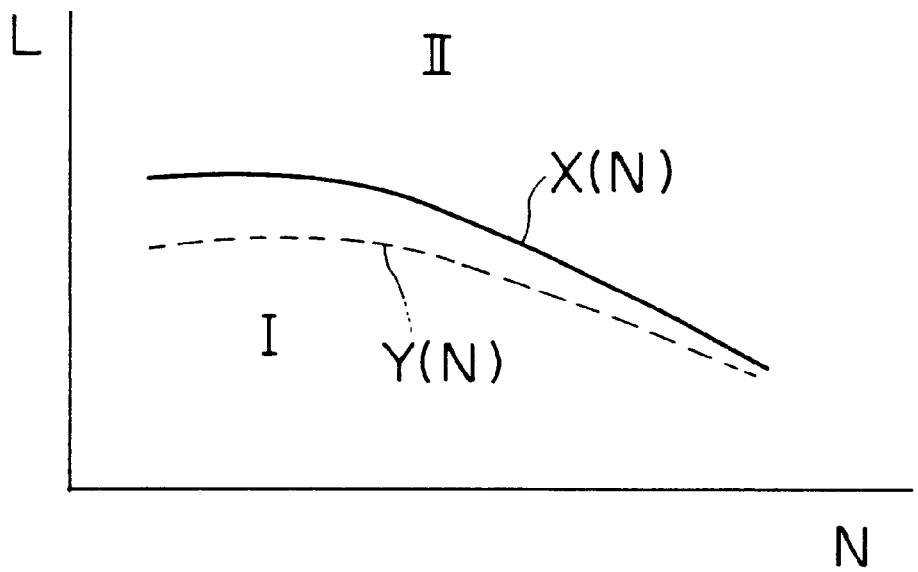
FIG. 7 is a diagram indicating a first operation region (I) and a second operation region (II)

FIG. 7 indicates a first operation region (1) in which the first mode of combustion, or the low-temperature combustion, is conducted, and the second operation region (II) in which the second mode of combustion, or the combustion based on the conventional combustion method, is conducted. In FIG. 7, the vertical axis L represents the amount of depression of the accelerator pedal 40, i.e., the requested load, and the horizontal axis N represents the engine revolution speed. Also in FIG. 7, X(N) represents a first boundary between the first operation region (I) and the second operation region (II), and Y(N) represents a second boundary between the first operation region (I) and the second operation region (II). A shift from the first operation region (I) to the second operation region (II) is judged based on the first boundary X(N), and a shift from the second operation region (II) to the first operation region (I) is judged based on the second boundary Y(N).

More specifically, if the requested load L exceeds the first boundary X(N), which is a function of the engine revolution speed N, when the engine is operating in the first operation region (I), and therefore the low-temperature combustion is being conducted, it is determined that a shift from the first operation region (I) to the second operation region (II) has occurred. Then, the combustion based on the conventional combustion method is conducted. If the requested load L subsequently decreases below the second boundary Y(N), which is a function of the engine revolution speed N, it is then determined that the engine operation has shifted from the second operation region (II) to the first operation region (I). In this case, the low-temperature combustion is conducted again.

The two boundaries, that is, the first boundary X(N) and the second boundary Y(N) on the low load side of the first boundary X(N), are provided for the following two reasons. The first reason is that in the second operation region (II) on the high load side, the combustion temperature is relatively high, and therefore the low-temperature combustion cannot be performed immediately upon a reduction in the requested load L across the first boundary X(N). That is, the low-temperature combustion can be immediately started, only after the requested load L becomes considerably low, that is, lower than the second boundary Y(N). The second reason is that it is desirable to provide a hysteresis with respect to operation region changes between the first operation region (I) and the second operation region (II).

While the engine is operating in the first operation region (I) where the low-temperature combustion is conducted, substantially no soot is produced and, instead, unburned hydrocarbon is discharged in the form of a soot precursor or the form preceding the precursor from the combustion chamber 5. The unburned hydrocarbon discharged from the combustion chamber 5 is well oxidized on the catalyst 22 having an oxidizing function. The catalyst 22 may be formed by, for example, an oxidation catalyst.

Figure 8:
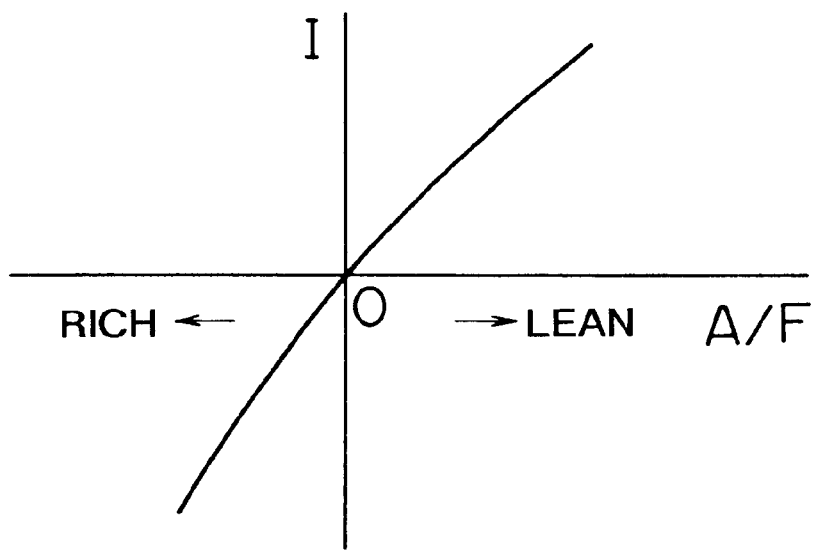
FIG. 8 is a diagram indicating an output of an air-fuel ratio sensor.

FIG. 8 indicates the output of the air-fuel ratio sensor 23a. As indicted in FIG. 8, the output current I of the air-fuel ratio sensor 23a changes in accordance with the air-fuel ratio A/F. Therefore, the air-fuel ratio can be determined from the output current I of the air-fuel ratio sensor 23a.

Figure 9:
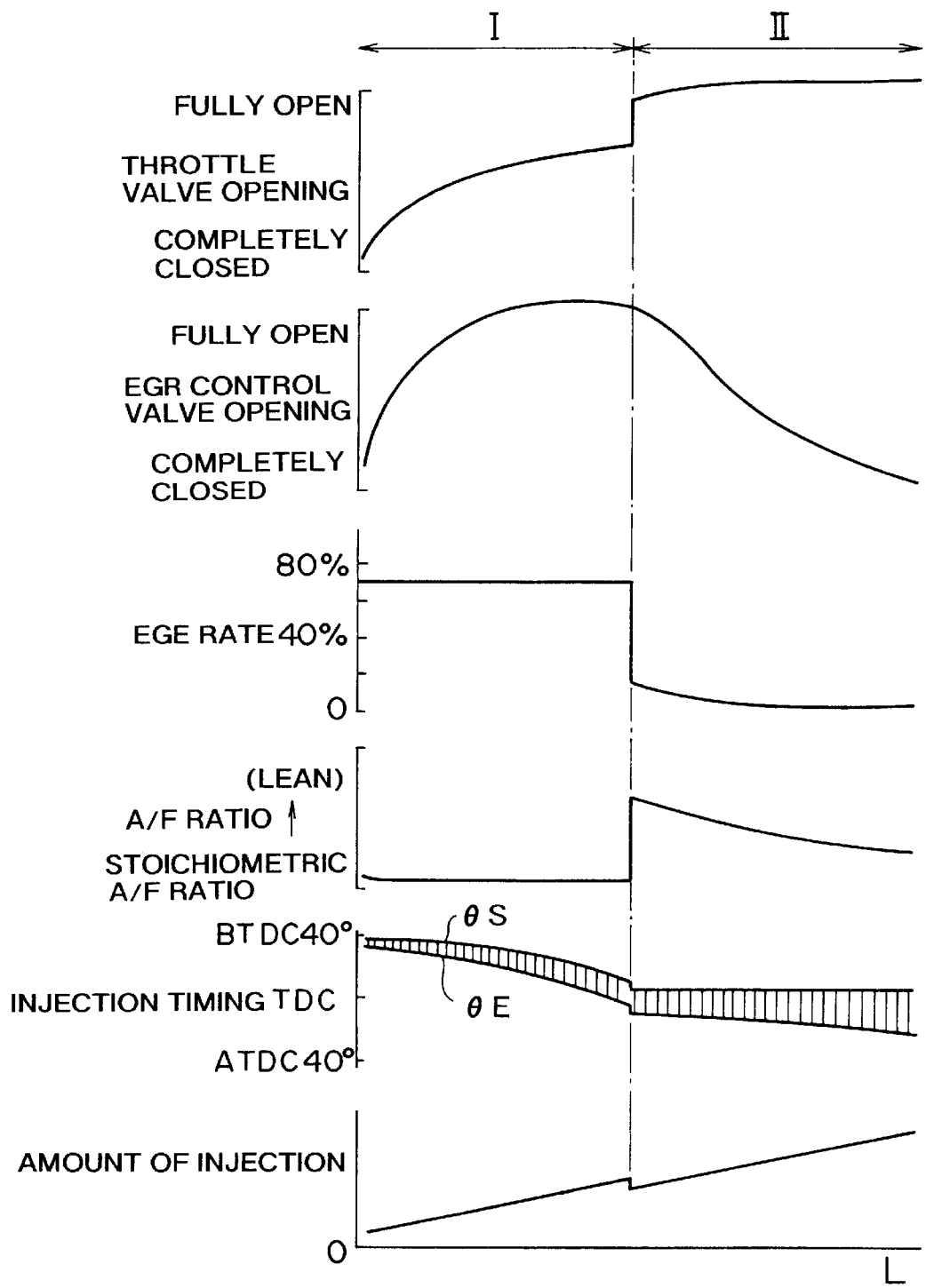
FIG. 9 is a diagram indicating a degree of opening of a throttle valve.

Referring next to FIG. 9, engine operation controls in the first operation region (I) and the second operation region (II), except a control performed at the time of engine start-up, will be briefly described.

FIG. 9 indicates changes in the degree of opening of the throttle valve 17, the degree of opening of the EGR control valve 25, the EGR rate, the air-fuel ratio, the injection timing, and the amount of fuel injected, with respect to the requested load L. In the first operation region (I) in which the requested load L is relatively low, the degree of opening of the throttle valve 17 is gradually increased from the vicinity of the completely closed state to about two thirds of the maximum degree of opening with increases in the requested load L, as indicated in FIG. 9. Similarly, the degree of opening of the EGR control valve 25 is increased from the vicinity of the completely closed state to the fully open state with increases in the requested load L.

In the first operation region (I), in the example of FIG. 9, the EGR rate is controlled to about 70%, and the air-fuel ratio set to a lean air-fuel ratio that is only slightly to the lean side. That is, in the first operating region (I), the opening of the throttle valve 17 and the opening of the EGR control valve 25 are controlled so that the EGR rate approximates to 70% and the air-fuel ratio becomes equal to the aforementioned slightly lean air-fuel ratio. Furthermore, in the first operation region (I), fuel injection is performed before the compression top dead center TDC is reached. In this case, the injection start timing θS is retarded with increases in the requested load L, and the injection end timing θE is also retarded as the injection start timing θS is retarded.

While the engine is idling, the throttle valve 17 is set near the completely closed position and the EGR control valve 25 is also set near the completely closed position. With the throttle valve 17 nearly completely closed, the pressure occurring in the combustion chamber 5 at the beginning of compression stroke decreases, and therefore the compression pressure decreases. As the compression pressure decreases, compression work performed by the piston 4 decreases, so that vibration of the engine main body 1 decreases. Namely, the throttle valve 17 is set to the vicinity of the completely closed position during idling of the engine in order to reduce the compression pressure and thereby reduce vibration of the engine main body 1. Furthermore, since the engine revolution non-uniformity caused by explosions is greater during a low-speed engine operation than during a high-speed engine operation, the problem of vibration of the engine main body 1 becomes more remarkable if the engine revolution speed is reduced. Therefore, the target engine revolution speed for idling is set, taking into consideration the vibration caused by compression pressure and the vibration caused by non-uniform engine revolution.

When the operation region of the engine has changed from the first operation region (I) to the second operation region (II), the degree of opening of the throttle valve 17 is increased in a stepped manner from a nearly two-third open state to the fully open state. At this moment in the example indicated in FIG. 9, the EGR rate is reduced in a stepped manner from about 70% to 40%, and the air-fuel ratio is increased in a stepped manner. Thus, the EGR rate skips the range of EGR rate in which smoke is produced in large amounts (FIG. 5), so that production of a large amount of smoke is avoided at the time of change of the engine operation region from the first operation region (I) to the second operation region (II).

In the second operation region (II), the mode of combustion that is performed in the conventional art is performed. In the second operation region (II), the throttle valve 17 is kept in the full-open state except for a part of the region (II), and the opening of the EGR control valve 23 is gradually reduced with increases in the requested load L. In this operation region (II), the EGR rate decreases with increases in the requested load L, and the air-fuel ratio decreases with increases in the requested load L. However, it is to be noted that the air-fuel ratio is kept within a lean range even if the requested load L is increased. In the second operation region (II), the injection start timing θS is set near the compression top dead center TDC.

Figure 10A:
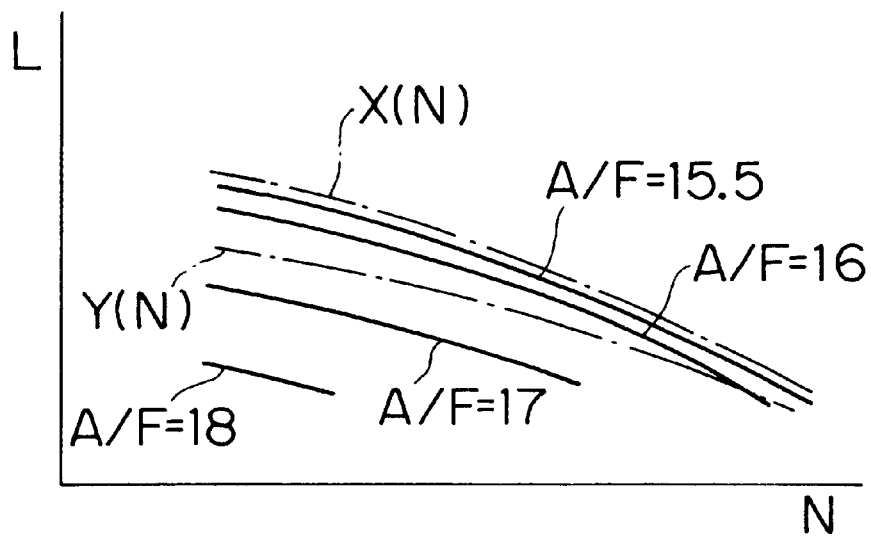
FIGS. 10A and 10B are a diagram indicating an example of air-fuel ratios in the first operation region (I)

FIG. 10A indicates the air-fuel ratio A/F during the first operation region (I). In FIG. 10A, curves labeled as A/F=15.5, A/F=16, A/F=17, and A/F=18 indicate the cases where the target air-fuel ratio is set to 15.5, 16, 17, and 18, respectively. The air-fuel ratios assigned to the curves are determined based on a proportional distribution. As indicated in FIG. 10A, the air-fuel ratio is in a lean range during the first operation region (I). Furthermore, in the first operation region (I), the target air-fuel ratio A/F is shifted toward the lean side as the requested load L is reduced. More specifically, the quantity of heat produced upon combustion decreases as the requested load L is reduced. Therefore, as the requested load L is reduced, low-temperature combustion becomes possible even with a reduced EGR rate. The air-fuel ratio increases with a reduction in the EGR rate. Therefore, the target air-fuel ratio A/F is increased with decreases in the requested load L as indicated in FIG. 10A. The fuel consumption rate improves as the target air-fuel ratio A/F is increased. Therefore, in order to set as lean an air-fuel ratio as possible, the target air-fuel ratio A/F is increased toward the lean side with decreases in the requested load L in this embodiment of the invention.

Figure 10B:
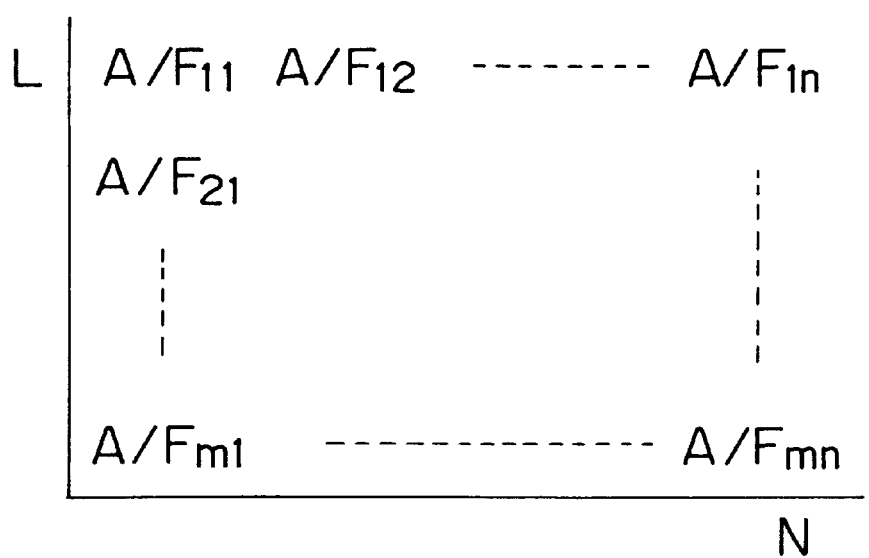
Figure 11A:
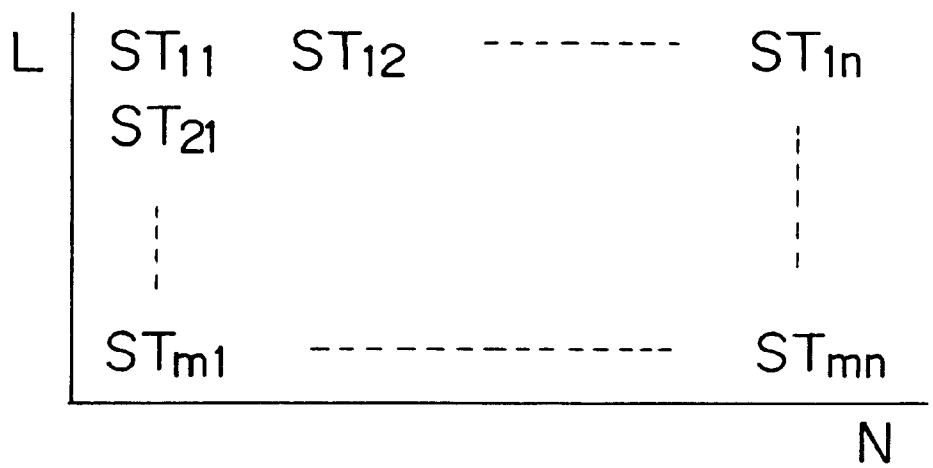

The target air-fuel ratio A/F indicated in FIG. 10A is pre-stored in the ROM 32 in the form of a map as a function of the requested load L and the engine revolution speed N as indicated in FIG. 10B. Also, the target degrees of opening ST of the throttle valve 17 needed to bring the air-fuel ratio to the target air-fuel ratios A/F as indicated in FIG. 10A are pre-stored in the ROM 32 in the form of a map as a function of the requested load L and the engine revolution speed N, as indicated in FIG. 11A. The target degrees of opening SE of the EGR control valve 25 needed to bring the air-fuel ratio to the target air-fuel ratios A/F as indicated in FIG. 10A are pre-stored in the ROM 32 in the form of a map as a function of the requested load L and the engine revolution speed N, as indicted in FIG. 11B.

Figure 12A:
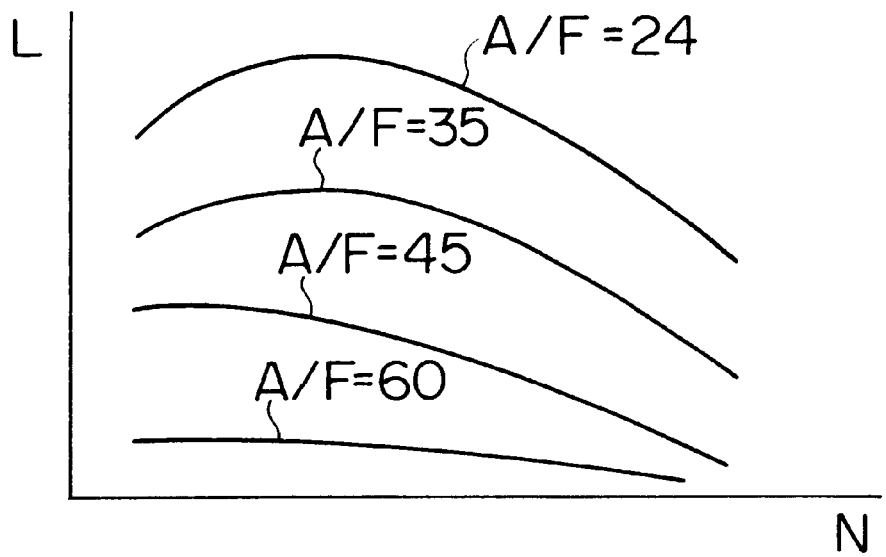
FIGS. 12A and 12B are a diagram indicating an example of air-fuel ratios in the second operation region (II)
Figure 12B:
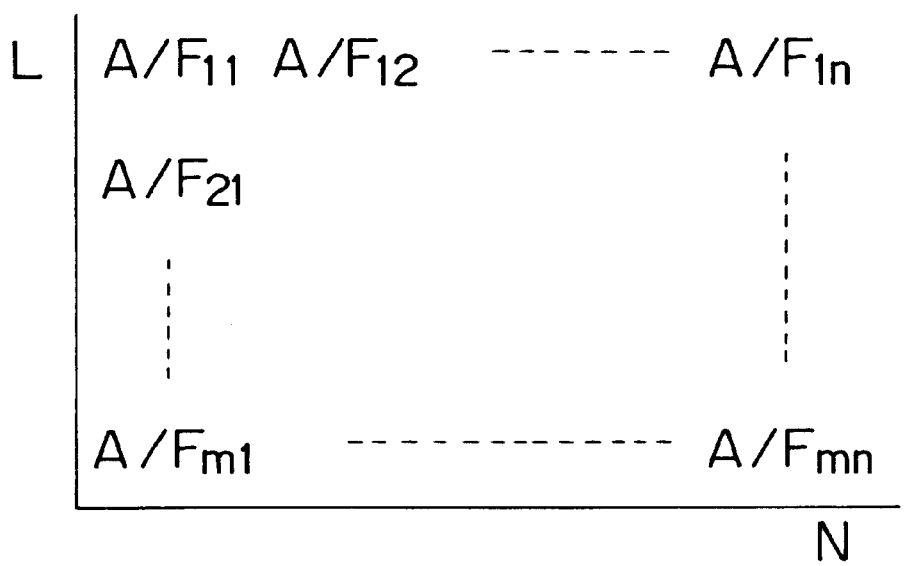
Figure 13A:
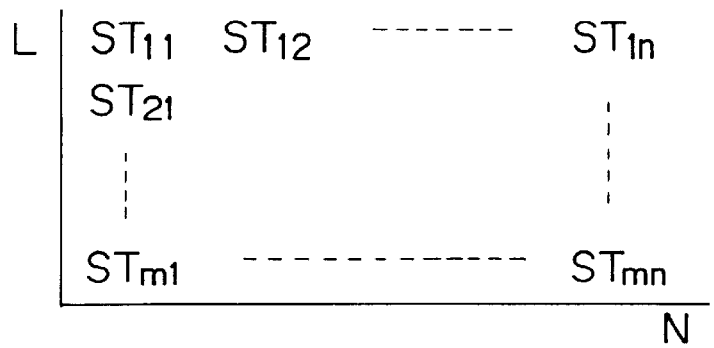
Figure 13B:
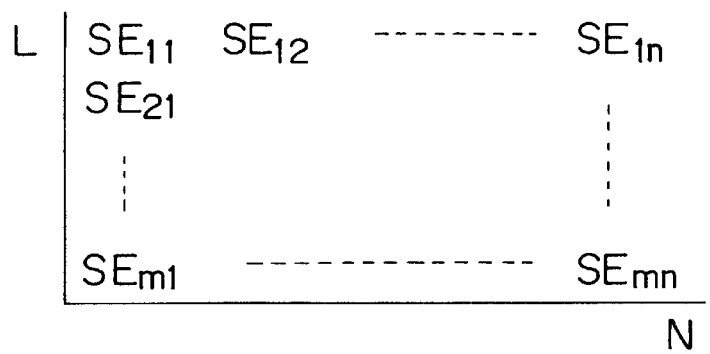

FIG. 12A indicates the target air-fuel ratio A/F set when the second mode of combustion, or the ordinary combustion based on the conventional combustion method, is performed. In FIG. 12A, curves labeled as A/F=24, A/F=35, A/F=45, and A/F=60 indicate that the target air-fuel ratio is equal to 24, 35, 45, and 60, respectively. The target air-fuel ratios A/F indicated in FIG. 12A are pre-stored in the ROM 32 in the form of a map as a function of the requested load L and the engine revolution speed N as indicated in FIG. 12B. Also, the target degrees of opening ST of the throttle valve 17 needed to bring the air-fuel ratio to the target air-fuel ratios A/F as indicated in FIG. 12A are pre-stored in the ROM 32 in the form of a map as a function of the requested load L and the engine revolution speed N, as indicated in FIG. 13A. The target degrees of opening SE of the EGR control valve 25 needed to bring the air-fuel ratio to the target air-fuel ratios A/F as indicated in FIG. 12A are pre-stored in the ROM 32 in the form of a map as a function of the requested load L and the engine revolution speed N, as indicated in FIG. 13B.

Figure 14:
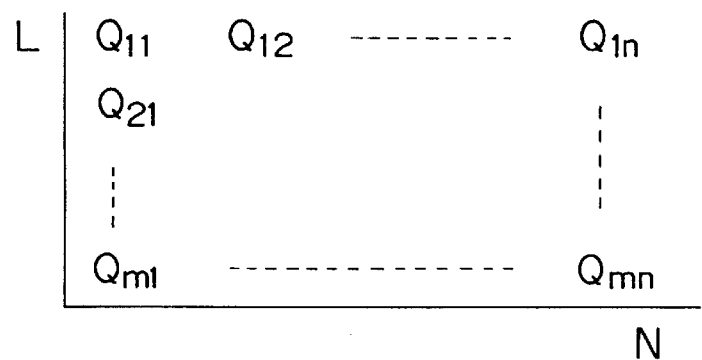
FIG. 14 is a diagram indicating amounts of fuel injection.

During operation in the second mode of combustion, the amount of fuel injection Q is calculated based on the requested load L and the engine revolution speed N. Amounts of fuel injection Q are pre-stored in the ROM 32 in the form of a map as a function of the requested load L and the engine revolution speed N as indicated in FIG. 14.

Figure 15:
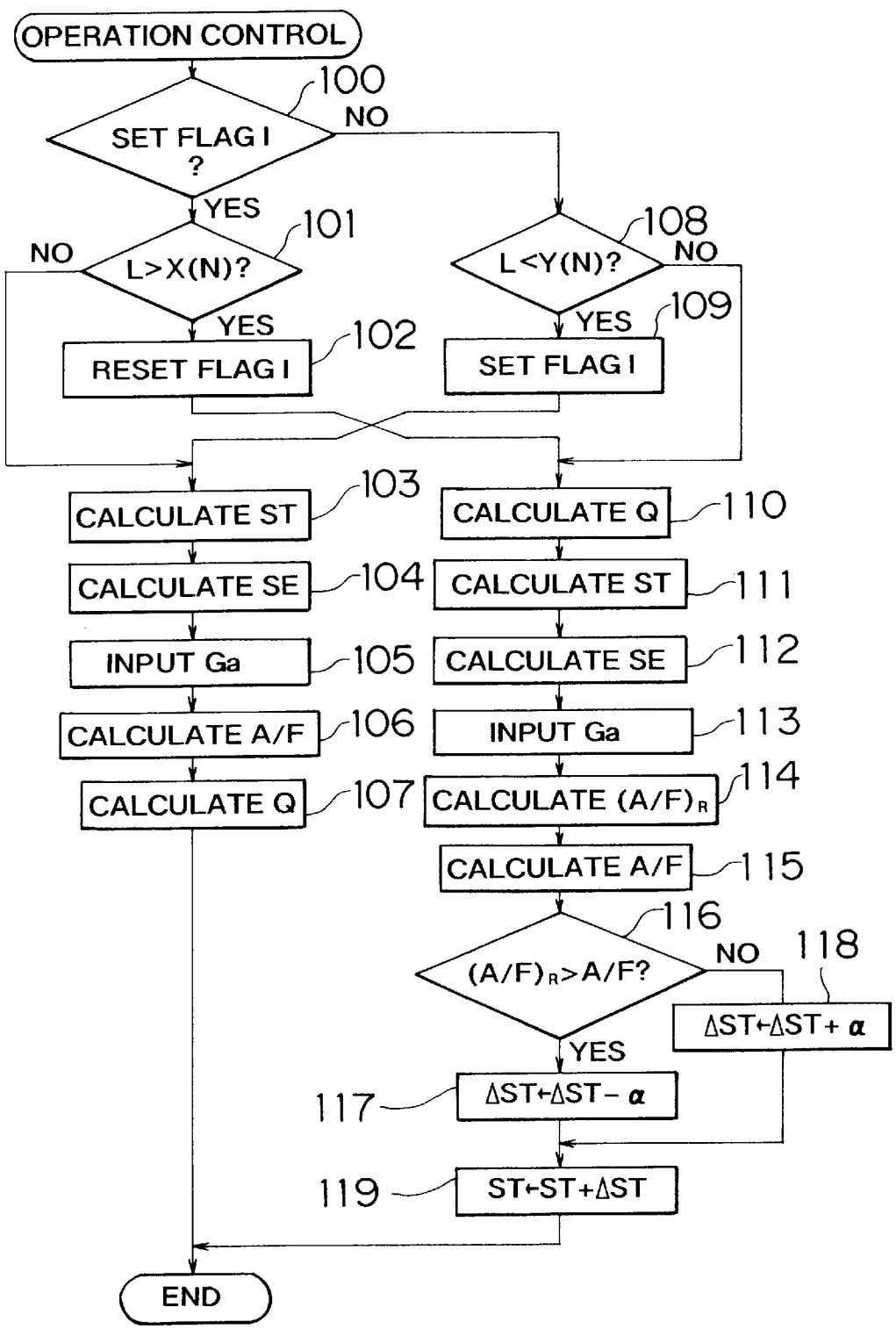
FIG. 15 is a flowchart for controlling an operation of the engine.

An operation control in accordance with the embodiment will be described with reference to FIG. 15. Referring to FIG. 15, it is determined in step 100 whether a flag I indicating that the present engine operation state is in the first operation region I has been set. If the flag I has been set, that is, if the present engine operation state is in the first operation region I, the process proceeds to step 101, in which it is determined whether the requested load L has exceeded the first boundary X(N). If L≦X(N), the process proceeds to step 103, in which the first mode of combustion (low-temperature combustion) is conducted. Conversely, if it is determined in step 101 that L>X(N), the process proceeds to step 102, in which the flag I is reset. Subsequently the process proceeds to step 110, and the second mode of combustion (ordinary combustion, that is, the combustion based on the conventional combustion method) is conducted.

If it is determined in step 100 that the flag I has not been set, that is, if the present engine operation state is in the second operation region (II), the process proceeds to step 108, in which it is determined whether the requested load L has become lower than the second boundary Y(N). If L≧Y (N), the process proceeds to step 110, and the second mode of combustion is performed. Conversely, if it is determined in step 108 that L<Y(N), the process proceeds to step 109, in which the flag I is set. Subsequently, the process proceeds to step 103, and the first mode of combustion is performed.

Figure 11B:
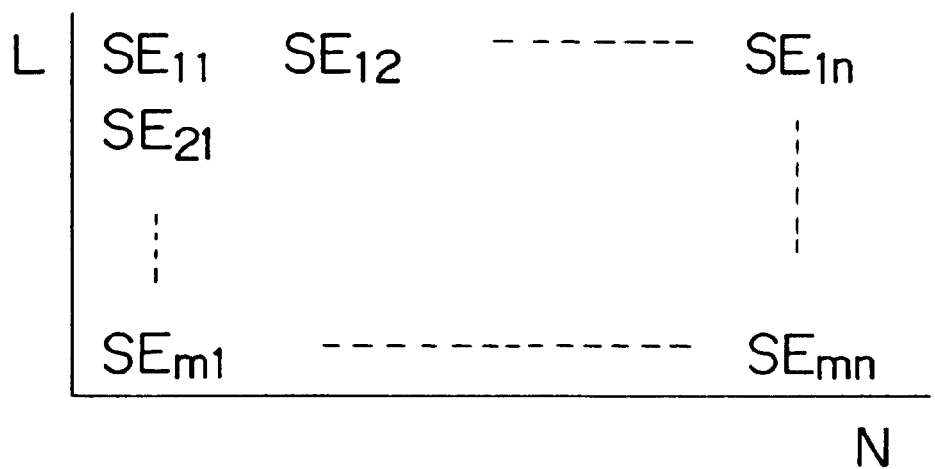

In step 103, a target degree of opening ST of the throttle valve 17 is calculated from the map as indicated in FIG. 11A, and the degree of opening of the throttle valve 17 is controlled to the calculated target degree of opening ST. Then, in step 104, a target degree of opening SE of the EGR control valve 25 is calculated from the map as indicated in FIG. 11B, and the degree of opening of the EGR control valve 25 is controlled to the calculated target degree of opening SE. Next, in step 105, the mass flow of intake air (hereinafter, simply referred to as "amount of intake air") Ga detected by the mass flow detector 17a is inputted. In step 106, a target air-fuel ratio A/F is calculated from the map as indicated in FIG. 10B. In step 107, the amount of fuel injection Q needed to bring the air-fuel ratio to the target air-fuel ratio A/F is calculated from the amount of intake air Ga and the target air-fuel ratio A/F.

If the requested load L or the engine revolution speed N changes when the low-temperature combustion is performed as described above, the degree of opening of the throttle valve 17 and the degree of opening of the EGR control valve 25 are immediately bought to the target degrees of opening ST, SE set in accordance with the requested load L and the engine revolution speed N. Therefore, for example, if the requested load L is increased, the amount of air in the combustion chamber 5 is immediately increased, so that the torque generated by the engine immediately increases. If the degree of opening of the throttle valve 17 or the degree of opening of the EGR control valve 25 is changed so that the amount of intake air changes, the change in the amount of intake air Ga is detected by the mass flow detector 17a. Based on the detected amount of intake air Ga, the amount of fuel injection Q is controlled. That is, the amount of fuel injection Q is changed after the amount of intake air Ga has actually changed.

In step 110, a target amount of fuel injection Q is calculated from the map as indicated in FIG. 14. The amount of fuel injected is controlled to the calculated target amount of fuel injection Q. In step 111, a target degree of opening ST of the throttle valve 17 is calculated from the map as indicated in FIG. 13A. Next, in step 112, a target degree of opening SE of the EGR control valve 25 is calculated from the map as indicated in FIG. 13B. The degree of opening of the EGR control valve 25 is controlled to the calculated target degree of opening SE. In step 113, the amount of intake air Ga detected by the mass flow detector 17a is inputted.

Next, in step 114, the actual air-fuel ratio $(A/F)_R$ is calculated from the amount of fuel injection Q and the amount of intake air Ga. Then, in step 115, a target air-fuel ratio A/F is calculated from the map as indicated in FIG. 12B. In step 116, it is determined whether the actual air-fuel ratio $(A/F)_R$ is greater than the target air-fuel ratio A/F. If $(A/F)_R$>A/F, the process proceeds to step 117, in which a correction value ΔST of the throttle opening is reduced by a constant value α. Then, the process proceeds to step 119. Conversely, if $(A/F)_R$<A/F, the process proceeds to step 118, in which the correction value ΔST of the throttle opening is increased by the constant value α. Then, the process proceeds to step 119. In step 119, a final target degree of opening ST of the throttle valve 17 is calculated by adding the correction value ΔST to the target degree of opening ST, and the degree of opening of the throttle valve 17 is controlled to the final target degree of opening ST. That is, the degree of opening of the throttle valve 17 is controlled so that the actual air-fuel ratio $(A/F)_R$ becomes equal to the target air-fuel ratio A/F.

If the requested load L or the engine revolution speed N changes when the second mode of combustion is performed, the amount of fuel injected is immediately brought to the target amount of fuel injection Q set in accordance with the requested load L and the engine revolution speed N. For example, if the requested load L is increased, the amount of fuel injection is immediately increased, so that the torque generated by the engine immediately increases. If the amount of fuel injection Q is increased so that the air-fuel ratio deviates from the target air-fuel ratio A/F, the degree of opening of the throttle valve 17 is controlled so that the air-fuel ratio becomes equal to the target air-fuel ratio A/F. That is, the air-fuel ratio is changed after the amount of fuel injection Q has been changed.

In the foregoing embodiment, the amount of fuel injection Q is controlled in an open loop manner during the low-temperature combustion mode, and the air-fuel ratio is controlled by changing the degree of opening of the throttle valve 17 during the second mode of combustion. However, it is also possible to feedback control the amount of fuel injection Q based on the output signal of the air-fuel ratio sensor 23a during the low-temperature combustion mode, and it is also possible to control the air-fuel ratio by changing the degree of opening of the EGR control valve 25 during the second mode of combustion.

Figure 17:
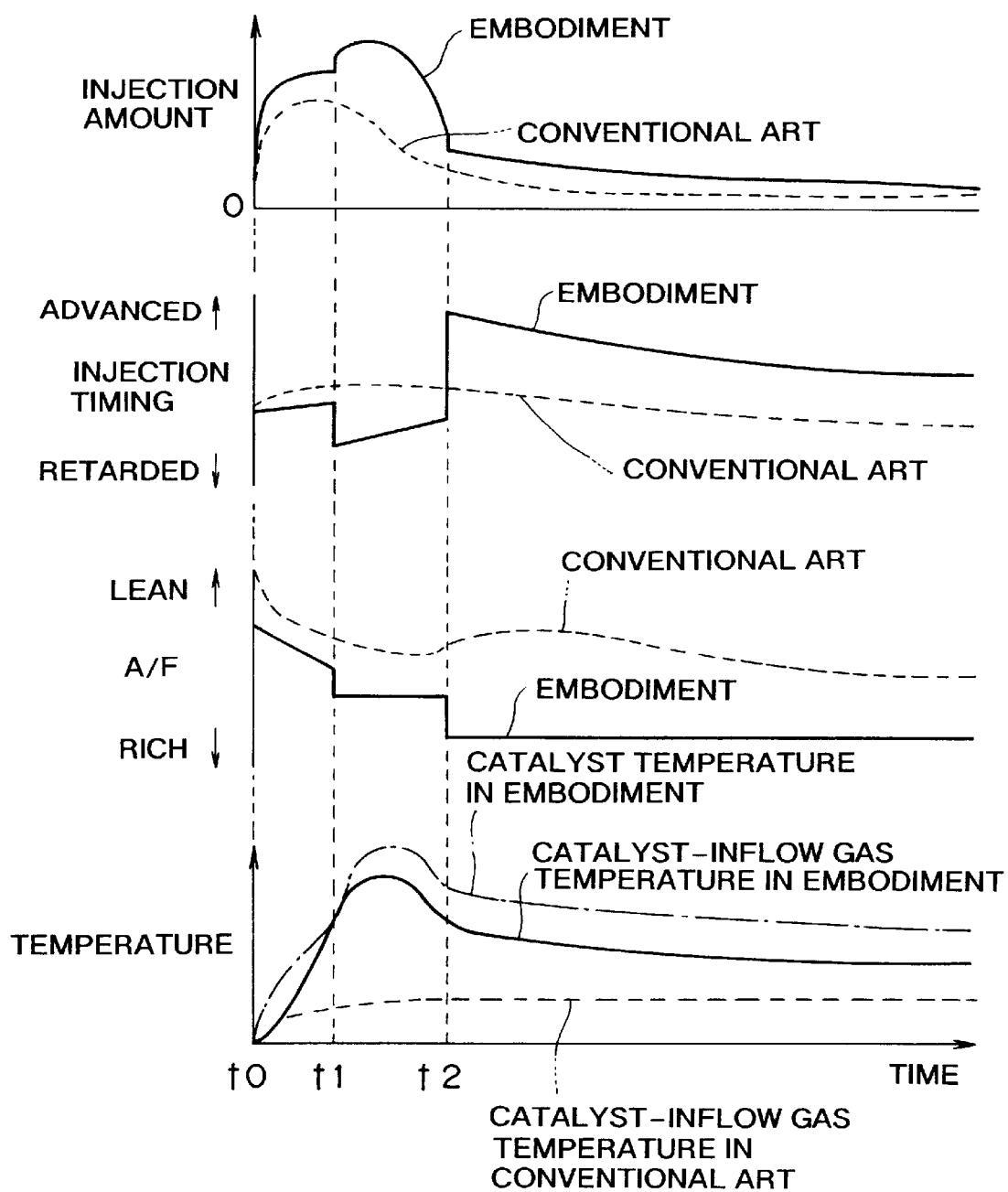
FIG. 17 is a diagram illustrating methods of controlling an operation of an internal combustion engine at the time of engine start-up.

FIGS. 16 and 17 are diagrams illustrating methods of controlling the operation of an internal combustion engine at the time of start-up. As illustrated in FIGS. 16 and 17, when the engine is started, the second mode of combustion in which the amount of EGR gas supplied into the combustion chamber 5 is less than the amount of EGR gas that peaks the production of soot is performed (time t0 to time t2). Subsequently, the first mode of combustion in which the amount of EGR gas supplied into the combustion chamber 5 is greater than the amount of EGR gas that peaks the production of soot and substantially no soot is produced is performed (from time t2 on).

More specifically, during the period (time to t0 time t1) until the torque reaches a peak Tpeak, only the main injection at the timing near the compression top dead center is performed and no injection at a timing different from the timing of the main injection is performed so as to avoid an increase in the amount of hydrocarbon present in exhaust gas. Furthermore, a combustion of a great amount of fuel injection that is close to the smoke limit is performed so that the temperature of exhaust gas discharged from the combustion chamber 5 will become relatively high and so that the engine revolution speed will increase overcoming the inertia of the engine. During this period, the engine revolution speed is increased in accordance with the increase in the coolant temperature, and the EGR control valve 25 is completely closed to keep the EGR rate at zero.

Furthermore, in order to quickly raise the exhaust gas temperature, the injection timing is retarded within a range that does not cause production of HC and white smoke. In order to reduce the amount of intake air and thereby raise the exhaust gas temperature, the opening of the throttle valve 17 is reduced within a range that does not cause production of smoke.

Immediately after the engine is started, the temperature of the catalyst 22 has not increased to a temperature that allows the catalyst 22 to remove hydrocarbons from exhaust gas. However, during the period of time t0 to time t1, a combustion that does not increase hydrocarbon in exhaust gas is performed, thereby avoiding emission of hydrocarbon into the atmosphere via the catalyst 22. Also, immediately after start-up of the engine, the temperature of the pipe catalyst 26a has not yet increased to a temperature that allows the pipe catalyst 26a to remove hydrocarbons from EGR gas. However, during the period of time t0 to time t1, the EGR rate is kept at zero and no EGR gas is supplied into the EGR passage 24, thus preventing an event that the EGR passage 24 embraced by the EGR cooler 26 is clogged with hydrocarbon that has passed through the pipe catalyst 26a.

Furthermore, during the period of time t0 to time t1, the pipe catalyst 26a is not supplied with EGR gas but the temperature of EGR gas discharged from the combustion chamber 5 is raised. Therefore, the warming-up rate of the pipe catalyst 26a occurring after the beginning of supply of EGR gas to the pipe catalyst 26a (from time t1 on) is increased. Still further, since the temperature of exhaust gas discharged from the combustion chamber 5 is increased during the period of time to t0 time t1, the catalyst 22 can remove hydrocarbon from exhaust gas at time t1. That is, the period of the time t0 to t1 is a period until the exhaust gas temperature or the temperature of the catalyst 22 reaches a certain level such that the catalyst 22 lights off.

Although in an embodiment, only the main injection near the compression top dead center is performed during the period of time t0 to time t1 so as to prevent increase in the amount of hydrocarbon in exhaust gas, it is also practicable according to other embodiments to perform the main injection near the compression top dead center and an additional injection at a short time interval prior to the main injection (generally termed short interval pilot injection) in order to prevent increase in the amount of hydrocarbon in exhaust gas.

Another embodiment will be further described. During a period (time t1 to time t2) until the warm-up of the pipe catalyst 26a is completed, the EGR control valve 25 is opened to raise the exhaust gas temperature and the throttle valve 17 is operated toward the closed side to reduce the amount of intake air, thus gradually increasing the EGR rate. During this period, the engine revolution speed is increased in accordance with the increasing coolant temperature, and the torque decreases to the level equal to the torque outputted during the idling operation. Furthermore during this period, in addition to the main injection near the compression top dead center, an additional injection is performed between the exhaust stroke and the intake stroke (generally termed VIGOM injection), and the injection timing is retarded, in order to increase the amount of hydrocarbon present in exhaust gas and to achieve relatively high temperature of exhaust gas discharged from the combustion chamber 5.

During the period of time t1 to time t2, the amount of hydrocarbon present in exhaust gas is increased and the temperature of exhaust gas discharged from the combustion chamber 5 is raised. The exhaust gas is supplied as EGR gas to the pipe catalyst 26a. Therefore, the warming-up rate of the pipe catalyst 26a after the beginning of supply of EGR gas to the pipe catalyst 26a (from time t1 on) increases. Furthermore, since the exhaust gas having an increased temperature and an increased hydrocarbon content is also supplied to the catalyst 22, the activation of the catalyst 22 is accelerated. That is, since the injection timing is retarded, the fuel economy deteriorates, so that the amount of fuel injected increases and the exhaust gas temperature further rises. Still further, due to the additional injection, the amount of hydrocarbon in exhaust gas increases, and the increased amount of hydrocarbon reacts in the catalysts 22, 26a, so the catalyst temperatures of the catalysts 22, 26a rise. Since the amount of intake air is decreased during this period, the temperature increase per energy is great. Such considerable temperature raise makes it possible to burn hydrocarbon and SOF adsorbed in the catalyst 22, 26a.

Although in this embodiment, the VICOM injection is performed during the period of time t1 to time t2 in addition to the main injection performed in the vicinity of the compression top dead center, it is also practicable in other embodiments to perform an injection during the expansion stroke or the exhaust stroke (generally termed post injection) in addition to the main injection near the compression top dead center in order to increase the amount of hydrocarbon in exhaust gas and raise the temperature of exhaust gas discharged from the combustion chamber 5.

When the warm-up of the pipe catalyst 26a is completed (time t2), the EGR rate is increased in a stepped manner in order to switch from the second mode of combustion to the first mode of combustion. Furthermore, the engine revolution speed is gradually decreased. Since the increasing of the amount of EGR gas flowing through the pipe catalyst 26a is performed after the completion of warm-up of the pipe catalyst 26a, the embodiment prevents an event that prior to the completion of warm-up of the pipe catalyst 26a, the amount of EGR gas is increased so that hydrocarbon in the EGR gas passes through the pipe catalyst 26a and clogs the EGR passage 24.

During a period (time t0 to time t1) before the catalyst 22 becomes able to remove hydrocarbon from exhaust gas, the amount of hydrocarbon supplied to the catalyst 22 is curbed by performing a mode of combustion that does not considerably increase the amount of hydrocarbon in exhaust gas. Therefore, pass of hydrocarbon in exhaust gas through the catalyst 22 is considerably reduced. Furthermore, during the period of time t0 to time t1, the mode of combustion that achieves relatively high temperature of exhaust gas discharged from the combustion chamber 5 is performed, so that the temperature of the catalyst 22 can be raised and the cylinder block 2 can be activated. That is, it becomes possible to quickly complete the warm-up of the catalyst 22 while reducing the passage of hydrocarbon through the catalyst 22, and to switch the combustion from the second mode of combustion to the first mode of combustion at an early time.

Furthermore, the amount of EGR gas is set to zero while the EGR gas temperature and the pipe catalyst 26a temperature are low and the pipe catalyst 26a has not become able to remove hydrocarbon from EGR gas (during the period of time t0 to time t1). Therefore, this embodiment prevents problems that occur when the pipe catalyst 26a is not able to remove hydrocarbon from EGR gas, and EGR gas flows through the EGR passage 24 so that the EGR passage 24 is clogged. Further, during the period of time t0 to time t1, a mode of combustion that relatively increases the temperature of exhaust gas discharged from the combustion chamber 5 is performed. Therefore, a preparation for raising the temperature of the pipe catalyst 26a can be performed. As a result, when EGR gas is caused to flow through the pipe catalyst 26a (from time t1 on), high-temperature EGR gas flows through the pipe catalyst 26a so that the warming-up rate of the pipe catalyst 26a after time t1 is increased. Still further, during the period of time t1 to time t2, the temperature of EGR gas supplied to the pipe catalyst 26a is raised, the amount of hydrocarbon contained in the EGR gas is increased, and the amount of EGR gas is gradually increased. Therefore, it becomes possible to reduce the duration between the time when the pipe catalyst 26a becomes able to remove hydrocarbon from EGR gas, and the time when warm-up of the pipe catalyst 26a is completed. That is, it becomes possible to quickly complete the warm-up of the pipe catalyst 26a while preventing the clogging of the EGR passage 24, and to switch the combustion from the second mode of combustion to the first mode of combustion at an early time.

Furthermore, according to an embodiment, during the period of time t1 to time t2, the main injection near the compression top dead center and an additional injection (the VIGOM injection or the post injection) at a timing different from the timing of the main injection are performed, and the amount of intake air is reduced. Since the VIGOM injection, or the post injection, is performed in addition to the main injection near the compression top dead center, the amount of unburned hydrocarbon in exhaust gas can be increased. Furthermore, due to the post-combustion of unburned hydrocarbon, relatively high temperature of exhaust gas discharged from the combustion chamber 5 can be achieved. Moreover, the reduction in the amount of intake air also raises the temperature of exhaust gas discharged from the combustion chamber 5 to a relatively high temperature.

According to an embodiment, the amount of EGR gas is gradually increased from zero after the exhaust gas temperature reaches a high temperature sufficient to warm up the pipe catalyst 26a (time t1). That is, the amount of EGR gas is kept at zero while (time t0 to time t1) the temperature of exhaust gas is so low that the exhaust gas cannot sufficiently raise the temperature of the pipe catalyst 26a, and therefore the pipe catalyst 26a is not able to remove hydrocarbon from EGR gas. After the temperature of exhaust gas becomes high so that the exhaust gas supplied to the pipe catalyst 26a raises the temperature of the pipe catalyst 26a, therefore configuring the pipe catalyst 26a to become able to remove hydrocarbon from EGR gas (time t1 to time t2), the amount of EGR gas is gradually increased from zero. Therefore, the embodiment is reliably prevents problems that occur when the pipe catalyst 26a is not yet able to remove hydrocarbon from EGR gas, and EGR gas is caused to flow through the EGR passage 24 thus resulting in the clogging of the EGR passage 24.

According to an embodiment, after the warm-up of the pipe catalyst 26a is completed so that the pipe catalyst 26a is able to remove a large amount of hydrocarbon (time t2), the combustion is switched from the second mode of combustion to the first mode of combustion, and the amount of EGR gas is increased in a stepped manner. Therefore, the embodiment reliably prevents problems that occur when the warm-up of the pipe catalyst 26a has not been completed, and the pipe catalyst 26a is not yet able to remove a large amount of hydrocarbon, causing a large amount of EGR gas to flow through the EGR passage 24 thus resulting in the clogging of the EGR passage 24.

In the illustrated embodiments, the controllers are implemented with general purpose processors. It will be appreciated by those skilled in the art that the controllers can be implemented using a single special purpose integrated circuit (e.g., ASIC) having a main or central processor section for overall, system-level control, and separate sections dedicated to performing various different specific computations, functions and other processes under control of the central processor section. The controllers can be a plurality of separate dedicated or programmable integrated or other electronic circuits or devices (e.g., hardwired electronic or logic circuits such as discrete element circuits, or programmable logic devices such as PLDs, PLAs, PALs or the like). The controllers can be suitably programmed for use with a general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controllers. A distributed processing architecture can be used for maximum data/signal processing capability and speed.

While the invention has been described with reference to what are preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An internal combustion engine having an exhaust gas recirculation passage for recirculating an exhaust gas discharged from a combustion chamber into an engine intake passage, wherein as an amount of a recirculating exhaust gas (EGR) supplied into the combustion chamber is increased, an amount of a soot produced gradually increases and peaks, and as the amount of the EGR supplied into the combustion chamber is further increased, a temperature of a fuel and a surrounding gas upon combustion in the combustion chamber becomes lower than a temperature that allows the soot to be produced, so that substantially no soot is produced, the internal combustion engine comprising:

an exhaust gas control catalyst that purifyies the exhaust gas discharged from the combustion chamber; and a controller that, at engine start-up, first causes performance of a second combustion in which the amount of the EGR supplied into the combustion chamber is less than the amount of EGR that peaks the amount of the soot produced, and then causes performance of a first combustion in which the amount of EGR supplied into the combustion chamber is greater than the amount of EGR that peaks the amount of the soot produced, and substantially no soot is produced, wherein when the second combustion is performed at the engine start-up, the controller first curbs an amount of a hydrocarbon supplied to the exhaust gas control catalyst by causing performance of a combustion in which the amount of the hydrocarbon in the exhaust gas does not increase and a temperature of the exhaust gas discharged from the combustion chamber becomes relatively high, and then the controller increases the amount of the hydrocarbon supplied to the exhaust gas control catalyst by causing performance of a combustion in which the amount of the hydrocarbon in the exhaust gas increases and the temperature of the exhaust gas discharged from the combustion chamber becomes relatively high.

2. The internal combustion engine according to claim 1, wherein the exhaust gas control catalyst is a recirculation exhaust gas control catalyst disposed in the exhaust gas recirculation passage; and the controller sets the amount of the EGR to zero when causing performance of the combustion in which the amount of the hydrocarbon in the exhaust gas does not increase and the temperature of the exhaust gas discharged from the combustion chamber becomes relatively high, and the controller gradually increases the amount of the EGR when causing performance of the combustion in which the amount of the hydrocarbon in the exhaust gas increases and the temperature of the exhaust gas discharged from the combustion chamber becomes relatively high.

3. The internal combustion engine according to claim 2, wherein the controller gradually increases the amount of the EGR from zero when the temperature of the exhaust gas has reached a temperature that is sufficiently high to warm up the recirculation exhaust gas control catalyst.

4. The internal combustion engine according to claim 3, wherein the amount of the EGR is increased in steps.

5. The internal combustion engine according to claim 2, wherein when the recirculation exhaust gas control catalyst has been warmed up, the second combustion is switched to the first combustion.

6. The internal combustion engine according to claim 1, wherein when the second combustion is performed at the engine start-up, the controller causes performance of a main fuel injection near a compression top dead center and an additional fuel injection at a timing different from a timing of the main fuel injection, and reduces an amount of an intake air to perform the combustion in which the amount of the hydrocarbon in the exhaust gas increases and the temperature of the exhaust gas discharged from the combustion chamber becomes relatively high.

7. A method of operating an internal combustion engine that uses an exhaust gas recirculation passage for recirculating an exhaust gas discharged from a combustion chamber into an engine intake passage, wherein as an amount of a recirculating exhaust gas (EGR) supplied into the combustion chamber is increased, an amount of a soot produced gradually increases and peaks, and as the amount of the EGR supplied into the combustion chamber is further increased, a temperature of a fuel and a surrounding gas upon combustion in the combustion chamber becomes lower than a temperature that allows the soot to be produced, so that substantially no soot is produced, the method comprising the steps of:

purifying the exhaust gas that is discharged from the combustion chamber; and performing a second combustion at engine start-up in which the amount of the EGR supplied into the combustion chamber is less than the amount of EGR that peaks the amount of the soot produced, and performing a first combustion in which the amount of EGR supplied into the combustion chamber is greater than the amount of EGR that peaks the amount of the soot produced, and substantially no soot is produced, wherein, when the second combustion is performed at the engine start-up, an amount of a hydrocarbon supplied to an exhaust gas control catalyst is curbed by performing a combustion in which the amount of the hydrocarbon in the exhaust gas does not increase and a temperature of the exhaust gas discharged from the combustion chamber becomes relatively high, and then the amount of the hydrocarbon supplied to the exhaust gas control catalyst is increased by performing a combustion in which the amount of the hydrocarbon in the exhaust gas increases and the temperature of the exhaust gas discharged from the combustion chamber becomes relatively high.

8. The method according to claim 7, wherein:

the exhaust gas that is discharged from the combustion chamber is purified using an recirculation exhaust gas control catalyst disposed in the exhaust gas recirculation passage; and the amount of the EGR is set to zero when performing the combustion in which the amount of the hydrocarbon in the exhaust gas does not increase and the temperature of the exhaust gas discharged from the combustion chamber becomes relatively high, and then gradually increasing the amount of the EGR when performing the combustion in which the amount of the hydrocarbon in the exhaust gas increases and the temperature of the exhaust gas discharged from the combustion chamber becomes relatively high.

9. The method according to claim 8, wherein the amount of the EGR is gradually increased from zero when the temperature of the exhaust gas has reached a temperature that is sufficiently high to warm up the recirculation exhaust gas control catalyst.

10. The method according to claim 9, wherein the amount of the EGR is increased in a stepped-up manner.

11. The method according to claim 8, wherein the second combustion is switched to the first combustion when the recirculation exhaust gas control catalyst has been warmed up.

12. The method according to claim 7, wherein when the second combustion is performed at the engine start-up, a main fuel injection is performed near a compression top dead center and an additional fuel injection is performed at a timing different from a timing of the main fuel injection, and an amount of an intake air is reduced to perform the combustion in which the amount of the hydrocarbon in the exhaust gas is increased and the temperature of the exhaust gas discharged from the combustion chamber becomes relatively high.

* * * * *